US009465942B1

United States Patent
Kane-Parry et al.

(10) Patent No.: US 9,465,942 B1
(45) Date of Patent: Oct. 11, 2016

(54) DICTIONARY GENERATION FOR IDENTIFYING CODED CREDENTIALS

(71) Applicant: AMAZON TECHNOLOGIES, INC., Reno, NV (US)

(72) Inventors: David James Kane-Parry, Seattle, WA (US); Thibault Candebat, Saint Germain en Laye (FR); Nima Sharifi Mehr, Vancouver (CA)

(73) Assignee: Amazon Technologies, Inc., Reno, NV (US)

( * ) Notice: Subject to any disclaimer, the term of this patent is extended or adjusted under 35 U.S.C. 154(b) by 109 days.

(21) Appl. No.: 14/459,037

(22) Filed: Aug. 13, 2014

Related U.S. Application Data

(63) Continuation-in-part of application No. 13/858,448, filed on Apr. 8, 2013.

(51) Int. Cl.
  *G06F 21/00* (2013.01)
  *G06F 21/57* (2013.01)
(52) U.S. Cl.
  CPC .................................. *G06F 21/57* (2013.01)
(58) Field of Classification Search
  CPC ............... G06F 21/52–21/57; G06F 21/563; G06F 21/566; G06F 21/567; G06F 21/577; G06F 11/36; G06F 11/3676; G06F 11/3684; G06F 11/3688
  USPC ...................................... 726/22–26
  See application file for complete search history.

(56) References Cited

U.S. PATENT DOCUMENTS

| | | | |
|---|---|---|---|
| 8,621,237 B1 * | 12/2013 | Bailey .................... | G06F 21/54 713/189 |
| 2008/0034425 A1 * | 2/2008 | Overcash ................ | G06F 21/55 726/22 |
| 2008/0120305 A1 * | 5/2008 | Sima ..................... | G06F 21/577 |
| 2008/0263669 A1 | 10/2008 | Alme | |
| 2012/0278884 A1 | 11/2012 | Menoher | |
| 2013/0067579 A1 | 3/2013 | Beveridge et al. | |
| 2013/0340076 A1 * | 12/2013 | Cecchetti ............... | G06F 21/55 726/23 |

OTHER PUBLICATIONS

Zoubair, Noura, "Final Office Action dated Sep. 16, 2015", U.S. Appl. No. 13/858,448, The United States Patent and Trademark Office, Sep. 16, 2015.

(Continued)

*Primary Examiner* — Kambiz Zand
*Assistant Examiner* — Noura Zoubair
(74) *Attorney, Agent, or Firm* — Lindauer Law, PLLC

(57) ABSTRACT

Techniques are described for identifying security credentials or other sensitive information by creating a dictionary of data elements included in documents such as source code files, object code files, or other types of files. The data elements may be identified for inclusion in the dictionary based on parsing the documents for delimiter characters, and based on the context of the data elements within the documents. The data elements may also be identified through an entropy-based analysis to detect portions of the documents exhibiting a high degree of entropy compared to a baseline entropy for the documents. The dictionary may be used in a dictionary attack against various systems to determine whether any of the data elements included in the dictionary enable access the systems. The data elements that enable access may be designated as sensitive information hardcoded into the documents.

20 Claims, 16 Drawing Sheets

(56) References Cited

OTHER PUBLICATIONS

Zoubair, Noura, "Advisory Action dated Dec. 11, 2015", U.S. Appl. No. 13/858,448, The United States Patent and Trademark Office, Dec. 11, 2015.

Zoubair, Noura, "Non-Final Office Action dated May 4, 2015", U.S. Appl. No. 13/858,448, The United States Patent and Trademark Office, May 4, 2015.

Zoubair, Noura, "Notice of Allowance dated Jan. 15, 2016", U.S. Appl. No. 13/858,448, The United States Patent and Trademark Office, Jan. 15, 2016.

\* cited by examiner

| | DICTIONARY DATA STRUCTURE 328 | | | |
|---|---|---|---|---|
| TEST DATA ELEMENT 1002(1) | HOST DEVICE IDENTIFIER(S) 1102(1) (E.G., IDENTIFYING HOST DEVICE(S) ASSOCIATED WITH THE DOCUMENT THAT INCLUDES THE TEST STRING) | RESULT(S) 1104(1) (E.G., INDICATING WHETHER TEST STRING ENABLED ACCESS) | RESULT(S) EXPIRATION TIME 1106(1) (E.G., WHEN THE TEST STRING MAY BE RE-TESTED) | |
| TEST DATA ELEMENT 1002(2) | HOST DEVICE IDENTIFIER(S) 1102(2) | RESULT(S) 1104(2) | RESULT(S) EXPIRATION TIME 1106(2) | |
| TEST DATA ELEMENT 1002(3) | HOST DEVICE IDENTIFIER(S) 1102(3) | RESULT(S) 1104(3) | RESULT(S) EXPIRATION TIME 1106(3) | |

FIG. 11

DICTIONARY GENERATION FOR IDENTIFYING CODED CREDENTIALS

CROSS-REFERENCE TO RELATED APPLICATION

This application is a continuation-in-part of, and claims priority to, pending U.S. patent application Ser. No. 13/858,448 filed on Apr. 8, 2013, entitled "Entropy-Based Detection of Sensitive Information in Code". The entirety of this previously filed application is hereby incorporated by reference.

BACKGROUND

Software development organizations generally implement processes and practices aimed at minimizing the security risks in the software that they produce. One such practice may be to avoid the hard-coding of security credentials into source code, given that the inclusion of security credentials in source code may make the software more vulnerable to attacks, or may compromise the security of the systems that are accessed using the security credentials. Regardless of such practices, inexperienced or inattentive software developers may still produce source code that includes hard-coded security credentials.

BRIEF DESCRIPTION OF THE DRAWINGS

FIG. 11 depicts an example schematic of a dictionary data structure that may store one or more data elements of a dictionary.

Figure 1:
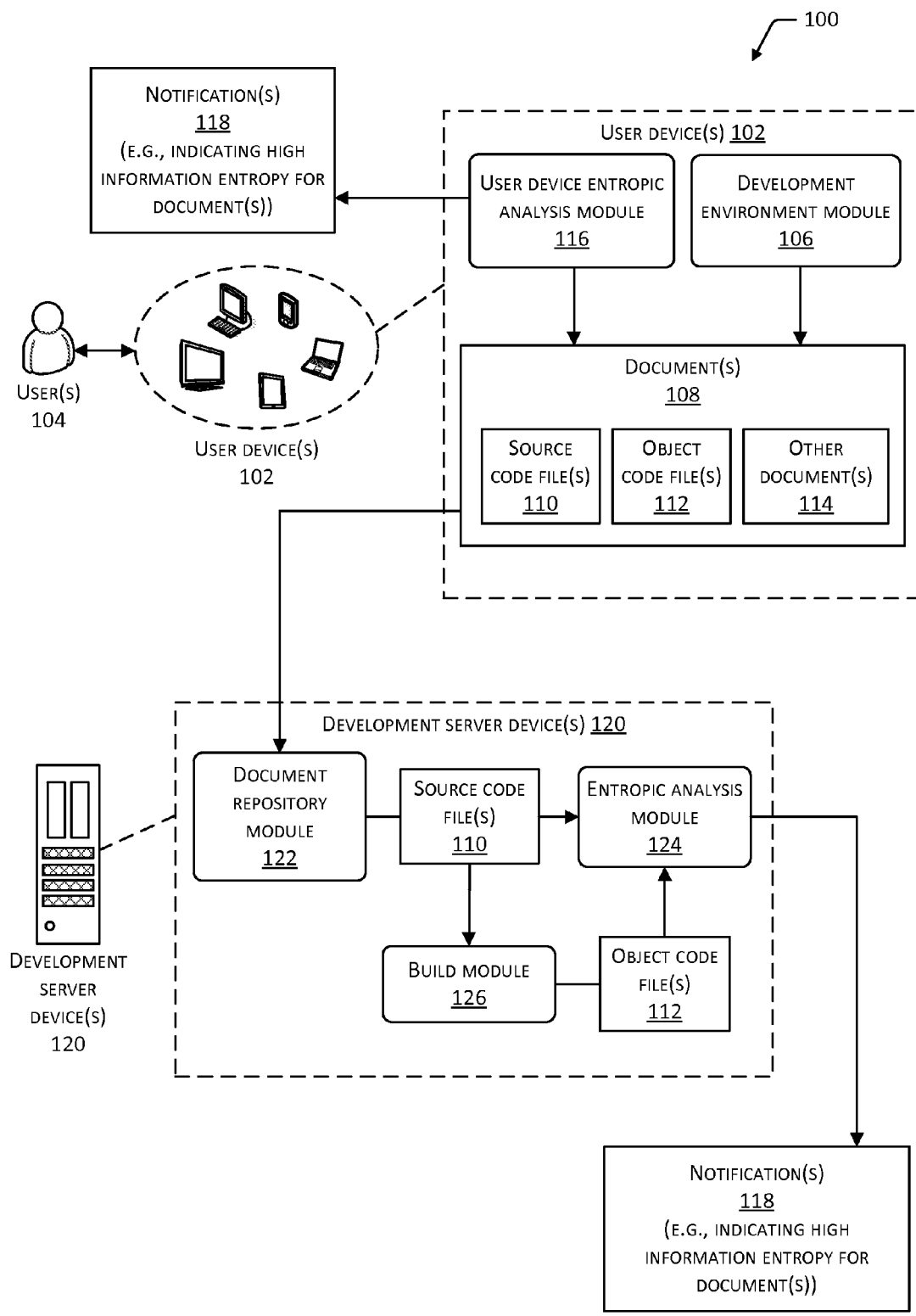
FIG. 1 depicts an environment including one or more user devices and one or more server devices configured to perform operations for entropy-based analysis of documents to identify sensitive information included in the documents.

Certain implementations and embodiments will now be described more fully below with reference to the accompanying figures, in which various aspects are shown. However, various aspects may be implemented in many different forms and should not be construed as limited to the implementations set forth herein. Like numbers refer to like elements throughout.

DETAILED DESCRIPTION

This disclosure describes implementations of systems, devices, methods, and computer-readable media for performing an entropy-based analysis of information in one or more documents, to identify potentially sensitive information indicated by high entropy portions of the document(s). In some instances, software developers may hard-code security credentials or other sensitive information into the source code of a computer program. This may inadvertently expose the security credentials to users who may have access to a source code repository that stores the source code, and such users may then employ the security credentials to access systems that they may not be authorized to access. Moreover, the hard-coding of security credentials into source code may enable potential attackers to obtain the credentials by reverse engineering the object code that is built from the source code and released to the public.

Although some developers may not understand the risks of hard-coding security credentials in source code, such developers may understand that security credentials are more effective if they exhibit a certain amount of randomness. Accordingly, security credentials that are hard-coded in source code may exhibit a higher degree of randomness than the surrounding source code. Such randomness may be measured as information entropy. Accordingly, implementations may analyze a document, such as a source code file or an object code file, to identify portions of the document that exhibit an information entropy that is above a threshold information entropy. The high entropy portions may then be identified as potentially sensitive information to be investigated for security risks.

As used herein, sensitive information may describe any information that is to be secured to hinder dissemination to the public, or that is at least to be secured to hinder dissemination to a wider audience than one or more authorized users. Sensitive information may comprise security information that enables access to secure systems or that enables secure communications. For example, security information may include security credentials employed to access a system, such as a username, a password, a token, a certificate, a passkey, answers to challenge questions, and so forth. As another example, security information may also include security credentials employed in secure communications, such as a public or private cryptographic key, a digital certificate, or other credentials employed in a secure authentication such as that provided by the Secure Sockets Layer (SSL), Transport Layer Security (TLS), or other protocol.

Sensitive information may also include other types of information, such as an initialization vector for a cipher, an Ethernet address, a media access control (MAC) address, a universally unique identifier (UUID), a uniform resource locator (URL), and so forth. The secure information described above, and other types of sensitive information, may exhibit a high degree of information entropy compared to the other information in the analyzed documents, and may be identifiable via an entropy-based document analysis as described herein. Although the examples provided herein describe performing an entropy-based analysis to identify secure information, implementations also support the identification of other types of sensitive information and are not limited to the examples provided herein.

Sensitive information may also include other types of information. In some cases, sensitive information may be information that is included in a document contrary to software development practices or policies that are encouraged or enforced within a software development organization. For example, sensitive information may include personal names, company names, address or other contact information for individuals, and so forth. Sensitive information may also include dynamic code (e.g., shell assembly code) that is incorporated as string data in source code. Such dynamic code may be read, interpreted, compiled, or executed at runtime to spawn processes or perform operations. Implementations may operate to detect the presence of such dynamic code in source code files.

As used herein, information entropy describes a measured degree of uncertainty or randomness of information. The information entropy may measure the extent to which a portion of information in a document is predictable based on the preceding information in the document, with more predictable information exhibiting a lower information entropy. Information entropy may refer to the Shannon entropy, which measures an expected value of information included in a document. A higher value of information entropy may indicate a greater degree of randomness in the information. Information entropy may be measured in various units, such as bits per character. As used herein, the term entropy refers to information entropy.

In some implementations, the information entropy of text in a document may be determined as inversely proportional to a frequency at which various words or strings occur in the document. For example, frequently or commonly occurring words or strings may have low information entropy, and infrequently or uncommonly occurring words or strings may have high information entropy. Words or other strings that occur once in a document may exhibit a maximum information entropy relative to other words or strings. In some cases, hard-coded security credentials or other secure information may have been inserted in a few locations or once in a document. Such rarely or singularly occurring words or strings may be identified as having high information entropy and flagged for further investigation. Accordingly, implementations may employ word or string frequency to determine information entropy, in addition to or instead of the information entropy calculated based on Shannon entropy as described above.

Implementations may analyze at least a portion of the information included in one or more documents to identify those portions that exhibit high information entropy. As used herein, a document may refer to a file or any other collection of information to be analyzed. The analyzed documents may include any type of information in any format. In a software development environment, the documents may include one or more source code files, object code files, binary executables, configuration files (e.g., makefiles), or other types of files associated with computer software, as described further with reference to FIG. 1.

This disclosure also describes implementations of systems, devices, methods, and computer-readable media for identifying potentially sensitive information (e.g., usernames, passwords, or other credentials) in one or more documents through a dictionary attack on one or more software modules executing on one or more host devices. In some implementations, one or more documents may be searched, parsed, or otherwise analyzed to identify one or more data elements that are present in the document(s). In some cases, the identified data element(s) may have been hard-coded into document(s) such as source code files or configuration files used to build executable software modules. In some cases, a programming language in which the document(s) are written may specify one or more delimiter characters that indicate the presence of a particular type of data element. Such delimiter character(s) may include one or more metadata tags, or one or more characters such as a single quote or double quote character. The document(s) may be searched for such delimiter characters, and the data elements enclosed or otherwise indicated by the delimiter characters may be identified and stored as test data element(s) in a dictionary data structure. In some implementations, the entropy-based analysis described herein may also be performed on the document(s) to identify test data element(s) to be incorporated into the dictionary data structure. Implementations also support the use of other methods to identify the data elements with document(s), such as a regular expression search.

In some implementations, the data elements searched for within the documents, and included in the dictionary data structure, may be strings. Such strings may be of any length and may include any number of alphabetic characters, numeric characters, symbol characters, or other characters. The strings may be encoded or otherwise described using an encoding format or character set such as any version of the American Standard Code for Information Interchange (ASCII) encoding scheme or any version of the Unicode encoding standard. Implementations also support other types of data included in the data elements, including but not limited to integer, double, floating point, or binary numeric data of any length.

In some implementations, a context of the data element(s) within the document(s) may be used to determine which data element(s) to include in the dictionary data structure. For example, a source code file may include a data element that is within a same class, within a same method, within a predetermined number of characters or lines, or otherwise proximate to another data element that is an identifier of a host device on which a software module may execute. In such cases, an inference may be made that the data element may be a hard-coded username, password, or other credential that is employable to access secure feature(s) of the software module or the host device. Accordingly, the proximity of the data element to the host device identifier may indicate that the data element is to be included in the dictionary data structure as a test data element.

Secure feature(s) of a software module may include any data or functionality to which access is restricted or limited to authorized users or processes. For example, secure feature(s) may be accessed following a successful authentication of a user based on providing a valid set of credentials such as one or more of a username, password, token, certificate, and so forth. Secure feature(s) may also include data that is encrypted, such that access to the data is contingent on the requester's possession of sensitive information such as a cryptographic key.

The dictionary data structure may store a dictionary that includes any number of test data elements. The dictionary data structure may be employed in a dictionary attack on one or more host devices, to determine whether the test data elements included in the dictionary data structure comprise credentials or other sensitive information. In a dictionary attack, one or more data elements, or one or more sets of the test data element(s), in the dictionary data structure may be provided to a software module, e.g., as a username/password pair, to request access to the software module or otherwise attempt to defeat the access control, authentication, or other security mechanisms of the software module. If a set of test data elements enables access to the software module, or to the host device on which the software module is executing, the set of test data elements may be designated as hard-coded credentials or other sensitive information. A notification may then be sent to a user to indicate that one or more instances of hard-coded sensitive information have been identified through the dictionary-based testing of the software module(s). Such dictionary-based analysis to identify hard-coded sensitive information is described further with reference to FIGS. 10-16.

FIG. 1 depicts an environment 100 including one or more devices that are configured to perform an entropy-based analysis of documents to identify sensitive information included in the documents. The environment 100 may include one or more user devices 102. The user device(s) 102 may be operated by, or otherwise associated with, one or more users 104. In some cases, the user(s) 104 may be members of a software development team, such as developers, testers, program managers, build managers, and the like. Other types of user(s) 104 may also employ the user device(s) 102.

The user device(s) 102 may be any type of computing device, including but not limited to a smartphone, a tablet computer, a wearable computer, an implanted computer, a mobile gaming device, an electronic book reader, an automotive computer, a desktop computer, a personal computer, a laptop computer, a thin client, a terminal, a game console, a smart appliance, a home entertainment device, a mainframe computer, a server computer, a network computer, and so forth. An example of the user device(s) 102 is described further with reference to FIG. 2.

In some implementations, the user device(s) 102 may include a development environment module 106 that enables the user 104 to generate one or more documents 108. In some cases, the development environment module 106 may be a stand-alone text editor such as vi, originally developed by Bill Joy; emacs, developed by the GNU™ project; WordPad® or Notepad®, produced by Microsoft Corp. of Redmond, Wash., USA; and so forth. The development environment module 106 may also include a word processing program such as Word®, produced by Microsoft Corp. of Redmond, Wash., USA; WordPerfect®, produced by Corel Corp. of Ottawa, Ontario, Canada; and so forth. The development environment module 106 may also include an Integrated Development Environment (IDE), such as Eclipse®, provided by the Eclipse Foundation; Visual Studio®, provided by Microsoft Corp. of Redmond, Wash., USA; and so forth. Such an IDE may include a text editor along with one or more software development tools such as compilers, linkers, interpreters, debuggers, and the like. The development environment module 106 may also include other types of applications or programs that generate the document(s) 108, including spreadsheet or accounting applications, document scanning or imaging applications, and so forth.

The development environment module 106 may enable the user 104 to generate the document(s) 108 by entering text, entering commands, or otherwise providing information to be included in the document(s) 108. The document(s) 108 may include one or more source code files 110 that include source code defining one or more computer programs. The source code file(s) 110 may include source code for classes, objects, methods, structures, functions, libraries, headers, and other elements of one or more computer programs. The source code files(s) 110 may also include configuration files, makefiles, string tables, resource files, or other information for defining or building a computer program.

The document(s) 108 may also include one or more object code files 112 that include machine-readable object code generated from the compilation of source code file(s) 110. The object code file(s) 112 may also include executable binary code for one or more computer programs, generated by compiling and linking the source code. In some cases, the object code file(s) 112 may include intermediate language code that is generated from the compilation of source code, and that is executable as a computer program by an interpreter, a virtual machine, or a runtime. For example, the object code file(s) 112 may include Java® language bytecodes that are produced by the compilation of Java® source code and that are executable by a Java® virtual machine, according to the Java® language specification provided by Oracle Corp. of Redwood City, Calif., USA.

The document(s) 108 may also include one or more other document(s) 114. Such other document(s) 114 may include, but are not limited to, unformatted text files and formatted text files such as those generated by Word®, produced by Microsoft Corp. of Redmond, Wash., USA; WordPerfect®, produced by Corel Corp. of Ottawa, Ontario, Canada; and so forth. Implementations support the entropy-based analysis of any number and type of the documents 108. The document(s) 108 may also include text, images, graphics, video, audio, or other types of content that describe the source code file(s) 110 or the object code file(s) 112, such as documentation, design specifications, marketing materials, project management information, and so forth.

In some implementations, the user device(s) 102 may include a user device entropic analysis module 116. The user device entropic analysis module 116 may analyze the information included in the document(s) 108, and identify any portions of the document(s) 108 that have an information entropy exceeding a predetermined threshold information entropy. In some cases, the user device entropic analysis module 116 may be incorporated into the development environment module 106 as a plug-in, module, or component. Alternatively, the user device entropic analysis module 116 may operate as a separate module from the development environment module 106.

The user device entropic analysis module 116 may identify any high entropy portions of the document(s) 108 written by the user 104 in the development environment module 106. The high entropy portions may be indicated to the user 104 by notifications 118, such as warnings, errors, or other messages that describe the identified high entropy portion(s) of the document(s) 108. In some cases, the notification(s) 118 may be presented through the development environment module 106. Alternatively, the notification(s) 118 may be sent as messages through other user interface elements of the user device(s) 102, or through communications such as email, text messages, and so forth.

In some implementations, the entropy-based analysis of the document(s) 108 may be performed as the user 104 is creating the document(s) 108 in the development environment module 106, and the notification(s) 118 may be sent in real time, substantially contemporaneously with the user 104 writing the document(s) 108. Alternatively, the entropy-based analysis may be performed in response to a command entered by the user 104 requesting the analysis, and the notification(s) 118 may be provided following the analysis.

The user device(s) 102 may communicate with one or more development server devices 120 to send the document(s) 108 to the development server device(s) 120. The development server device(s) 120 may be any type of computing device, including but not limited to a desktop computer, a personal computer, a mainframe computer, a server computer, a network computer, a cloud computing device, and so forth. An example of the development server device(s) 120 is described further with reference to FIG. 3.

In some implementations, the development server device(s) 120 may include a document repository module 122, which stores one or more of the documents 108. The document repository module 122 may include a source control system, a source code repository, or a revision control system, such as Perforce® developed by Perforce Software Inc., of Alameda, Calif., USA. The source code file(s) 110, object code file(s) 112, or other document(s) 114 generated on the user device(s) 102 may be checked into, or otherwise provided to, the document repository module 122. The document repository module 122 may then store the document(s) 108 in data storage on the development server device(s) 120 or elsewhere. In some cases, the document repository module 122 may be employed to access (e.g., check out) the document(s) 108, and view information regarding the history of document changes, documents ownership, check-ins, and so forth.

In some implementations, the development server device(s) 120 may include an entropic analysis module 124. The entropic analysis module 124 may analyze the information included in one or more documents 108, and identify any portions that have an information entropy exceeding a predetermined threshold information entropy. The identified high entropy portions of the document(s) 108 may be reported as including potentially sensitive information or portions of interest to be further examined.

As shown in FIG. 1, the entropic analysis module 124 may analyze one or more of the source code files 110 checked into the document repository module 122, and identify any high entropy portions of such source code files 110. Alternatively, the entropic analysis module 124 may analyze one or more object code files 112. The object code files 112 may be generated by a build module 126 that executes on the development server device(s) 120. The build module 126 may retrieve the source code file(s) 110 from the document repository module 122 and perform operations for compiling, linking, or otherwise building the object code file(s) 112 from the source code file(s) 110. The entropic analysis module 124 may also analyze one or more other document(s) 114, such as formatted or unformatted text documents.

The entropy-based analysis of the document(s) 108 may be performed on the user device(s) 102 by the user device entropic analysis module 116, on the development server device(s) 120 by the entropic analysis module 124, or on both the user device(s) 102 and the development server device(s) 120. On the development server device(s) 120, the entropic analysis module 124 may perform an entropy-based analysis of the document(s) 108 when they are checked into, added to, or updated in the document repository module 122. Alternatively, the entropic analysis module 124 may perform an entropy-based analysis of the source code file(s) 110 or the object code file(s) 112 at build time, when the build module 126 performs build operations to generate the object code file(s) 112. Moreover, the entropic analysis module 124 may perform an entropy-based analysis of any of the document(s) 108 at any time, in response to a user request for such as analysis, or as a scheduled job. Operations of one or both of the user device entropic analysis module 116 and the entropic analysis module 124 are described further with reference to FIGS. 4-9.

In some implementations, the entropic analysis module 124 may send the notification(s) 118, indicating the portions of the document(s) 108 that exhibit high information entropy. Such notification(s) 118 may be sent to the user(s) 104 that created or edited the document(s) 108 to include the high information entropy portions. The notification(s) 118 may also be sent to other user(s) 104, such as program managers, build managers, testers, other developers, and so forth. The notification(s) 118 may include e-mails, text messages, or other types of communications, and may describe those portions of the document(s) 108 that have been identified as having a high information entropy. The notification(s) 118 may enable those users 104 receiving the notification(s) 118 to investigate whether the high information entropy portions correspond to potential security risks such as hard-coded security credentials or other types of sensitive information. In some cases, the user device entropic analysis module 116 may also send the notification(s) 118, instead of or in addition to providing warnings or other notifications via the development environment module 106. Implementations support providing the notification(s) 118 from the development server device(s) 120, from the user device(s) 102, or from both.

In addition to or instead of sending the notification(s) 118, one or both of the entropic analysis module 124 and the user device entropic analysis module 116 may perform other types of actions based on identifying high entropy portions of the document(s) 108. In some cases, the high entropy portions may be deleted from the document(s) 108. Alternatively, the high entropy portions may be disabled, for example by commenting out the high entropy portions of the source code file(s) 110. The high entropy portions may also be replaced with other code that may present less of a potential security risk.

The various devices of the environment 100 may communicate with one another using one or more networks. Such networks may include public networks such as the Internet, private networks such as an institutional or personal intranet, or some combination of private and public networks. The networks may include any type of wired or wireless network, including but not limited to local area networks (LANs), wide area networks (WANs), wireless WANs (WWANs), wireless LANs (WLANs), and mobile communications networks (e.g. 3G, 4G, and so forth).

Figure 2:
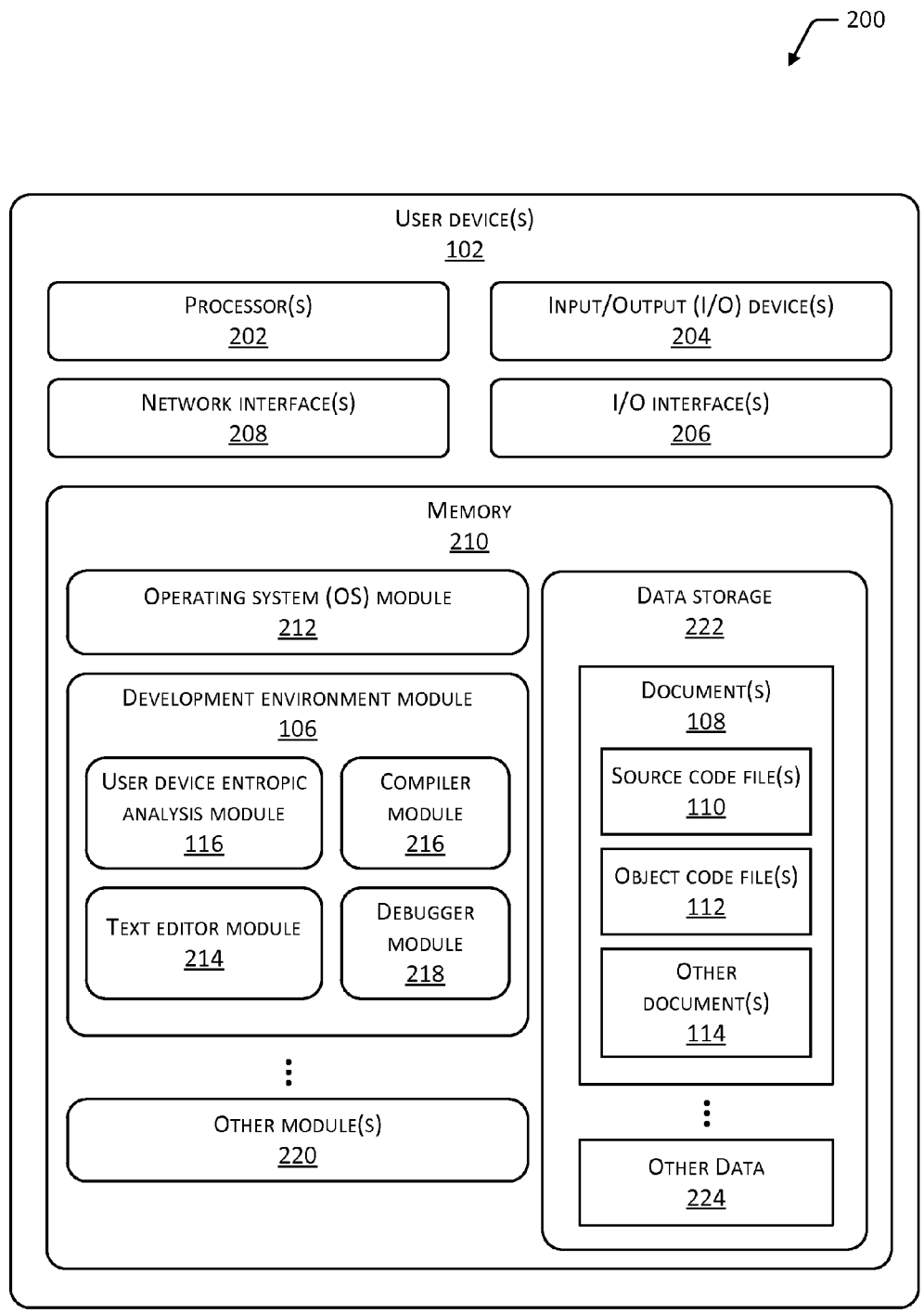
FIG. 2 depicts a block diagram of a user device configured to perform operations for identifying sensitive information based on entropy-based analysis.

FIG. 2 depicts a block diagram 200 of an example user device 102 that is configured to perform operations for identifying sensitive information based on entropy-based analysis. As shown in the block diagram 200, the user device(s) 102 may include one or more processors 202 (e.g., hardware-based processor(s)) configured to execute one or more stored instructions. The processor(s) 202 may comprise one or more cores.

The user device(s) 102 may include one or more input/output (I/O) devices 204. The I/O device(s) 204 may include input devices such as a keyboard, a mouse, a pen, a game controller, a touch input device, an audio input device (e.g., a microphone), an image capture device (e.g., a camera), a gestural input device, a haptic input device, or other devices. In some cases, the I/O device(s) 204 may also include output devices such as a display, an audio output device (e.g., a speaker), a printer, a haptic output device, an olfactory (e.g., smell-based) output device, a gustatory (e.g., taste-based) output device, and so forth. The I/O device(s) 204 may be physically incorporated with the user device(s) 102, or may be externally placed.

The user device(s) 102 may include one or more I/O interfaces 206 to enable components or modules of the user device(s) 102 to control, interface with, or otherwise communicate with the I/O device(s) 204. The I/O interface(s) 206 may enable information to be transferred in or out of the user device(s) 102, or between components of the user device(s) 102, through serial communication, parallel communication, or other types of communication. For example, the I/O interface(s) 206 may comply with a version of the RS-232 standard for serial ports, or with a version of the Institute of Electrical and Electronics Engineers (IEEE) 1284 standard for parallel ports. As another example, the I/O interface(s) 206 may be configured to provide a connection over Universal Serial Bus (USB) or Ethernet. In some cases, the I/O interface(s) 206 may be configured to provide a serial connection that is compliant with a version of the IEEE 1394 standard. The user device(s) 102 may also include one or more busses or other internal communications hardware or software that allow for the transfer of data between the various modules and components of the user device(s) 102.

The user device(s) 102 may include one or more network interfaces 208 to enable communications between the user device(s) 102 and other networked devices. The network interface(s) 208 may include one or more network interface controllers (NICs) or other types of transceiver devices configured to send and receive communications over a network.

The user device(s) 102 may include one or more memories, described herein as memory 210. The memory 210 comprises one or more computer-readable storage media (CRSM). The CRSM may include one or more of an electronic storage medium, a magnetic storage medium, an optical storage medium, a quantum storage medium, a mechanical computer storage medium, and so forth. The memory 210 provides storage of computer-readable instructions, data structures, program modules, and other data for the operation of the user device(s) 102.

The memory 210 may include an operating system (OS) module 212. The OS module 212 is configured to manage hardware resources such as the I/O device(s) 204, the I/O interface(s) 206, and the network interface(s) 208, and to provide various services to applications, processes, or modules executing on the processor(s) 202. The OS module 212 may include one or more of the following: any version of the Linux® operating system; any version of iOS™ from Apple Corp. of Cupertino, Calif., USA; any version of Windows® or Windows Mobile® from Microsoft Corp. of Redmond, Wash., USA; any version of Android® from Google Corp. of Mountain View, Calif., USA and its derivatives from various sources; any version of Palm OS® from Palm Computing, Inc. of Sunnyvale, Calif., USA and its derivatives from various sources; any version of BlackBerry OS® from Research In Motion Ltd. of Waterloo, Ontario, Canada; any version of VxWorks® from Wind River Systems of Alameda, Calif., USA; or other operating systems.

In some implementations, the memory 210 includes the development environment module 106. As described above, the development environment module 106 may include a text editor module 214. In some cases, the development environment module 106 may be a stand-alone text editor module 214 that generates formatted or unformatted text files, source code files, or other types of files. Alternatively, the development environment module 106 may include a text editor module 214 that interacts with one or more other modules in a suite of development tools, such as in an IDE. In such cases, the development environment module 106 may include a compiler module 216 that compiles source code file(s) 110 to generate object code file(s) 112, a debugger module 218 for debugging a computer program, and so forth.

The development environment module 106 may include other modules for performing software development tasks, such as a linker module, an interpreter module, or an execution module to respectively perform link, interpretation, or execution operations. The development environment module 106 may also include a user interface for displaying the source code file(s) 110, or other information. The development environment module 106 may perform tasks related to the generation of the source code file(s) 110, the object code file(s) 112, or other types of document(s) 108 generated during the software development process. The development environment module 106 may also perform operations to generate other types of document(s) 108 not associated with software development.

As shown in the example of FIG. 2, the user device entropic analysis module 116 may be included in the development environment module 106 (e.g., as a plug-in module or component). Alternatively, the user device entropic analysis module 116 may execute as a separate module or process on the memory 210. Operations of the user device entropic analysis module 116 are described further with reference to FIGS. 4-9.

The memory 210 may also include one or more other modules 220, such as a user authentication module, an access control module, a security or cryptography module, and so forth.

The memory 210 may include data storage 222 to store information for operations of the user device(s) 102. The data storage 222 may comprise a database, array, structured list, tree, or other data structure, and may be a relational or a non-relational datastore. The data storage 222 may store the document(s) 108, including but not limited to the source code file(s) 110, the object code file(s) 112, and the other document(s) 114. The data storage 222 may also store other data 224, such as user account information, user authentication information, and so forth. In some implementations, at least a portion of the information stored in the data storage 222 may be stored externally to the user device(s) 102, on other devices that are accessible to the user device(s) 102 via the I/O interface(s) 206 or via the network interface(s) 208.

Figure 3:
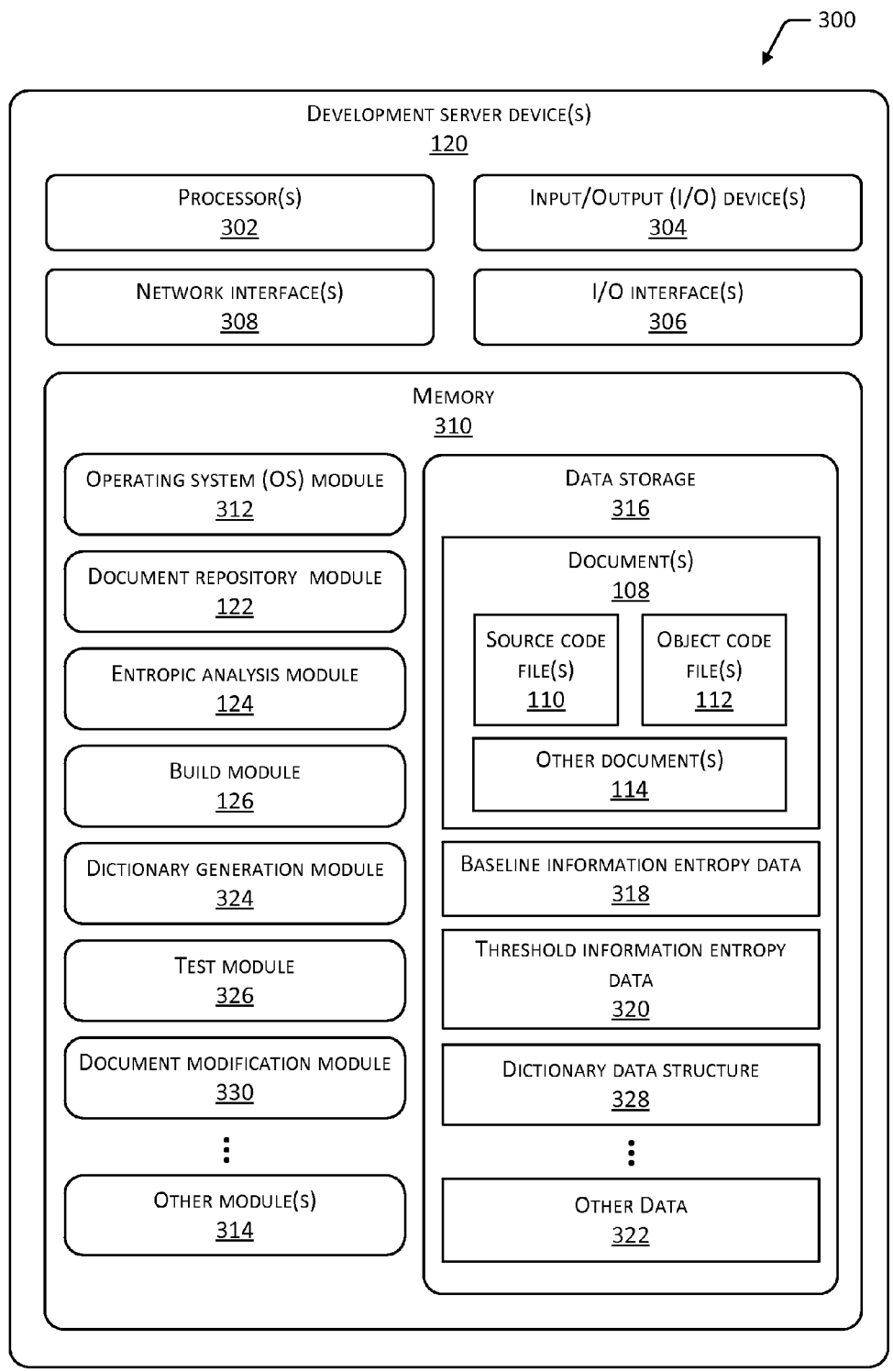
FIG. 3 depicts a block diagram of a development server device configured to perform operations for identifying sensitive information based on one or both of an entropy-based analysis or a dictionary-based analysis.

FIG. 3 depicts a block diagram 300 of an example development server device 120 that is configured to perform operations for identifying sensitive information based on entropy-based analysis. As shown in the block diagram 300, the development server device(s) 120 may include one or more processors 302 (e.g., hardware-based processor(s)) configured to execute one or more stored instructions. The processor(s) 302 may comprise one or more cores.

The development server device(s) 120 may include one or more I/O devices 304, one or more I/O interfaces 306, and one or more network interfaces 308, such as those described above with reference to the I/O device(s) 204, the I/O interface(s) 206, and the network interface(s) 208 respectively. The I/O device(s) 304 may be physically incorporated with the development server device(s) 120, or may be externally placed.

The development server device(s) 120 may include one or more memories, described herein as memory 310. The memory 310 comprises one or more CRSM. The CRSM may include one or more of an electronic storage medium, a magnetic storage medium, an optical storage medium, a quantum storage medium, a mechanical computer storage medium, and so forth. The memory 310 provides storage of computer-readable instructions, data structures, program modules, and other data for the operation of the development server device(s) 120.

The memory 310 may include an OS module 312 that is configured to manage hardware resources such as the I/O device(s) 304, the I/O interface(s) 306, and the network interface(s) 308, and to provide various services to applications, processes, or modules executing on the processor(s) 302. The OS module 312 may include one or more operating systems such as those described above with reference to the OS module 212.

In some implementations, the memory 310 includes the document repository module 122 and the build module 126 as described above with reference to FIG. 1. The memory 310 may also include the entropic analysis module 124, described further with reference to FIGS. 4-9. The memory 310 may also include one or more other modules 314, such as a user authentication module, an access control module, a security or cryptography module, and so forth.

The memory 310 may include data storage 316 to store information for operations of the development server device(s) 120. The data storage 316 may comprise a database, array, structured list, tree, or other data structure, and may be a relational or a non-relational datastore. The data storage 316 may store the document(s) 108, including but not limited to the source code file(s) 110, the object code file(s) 112, and the other document(s) 114. In some implementations, the data storage 316 may store baseline information entropy data 318 and threshold information entropy data 320, as described further with reference to FIGS. 5 and 7. The baseline information entropy data 318 and the threshold information entropy data 320 may also be stored on the user device(s) 102 and employed during operations of the user device entropic analysis module 116.

The data storage 316 may also store other data 322, such as user account information, user authentication information, and so forth. In some implementations, at least a portion of the information stored in the data storage 316 may be stored externally to the development server device(s) 120, on other devices that are accessible to the development server device(s) 120 via the I/O interface(s) 306 or via the network interface(s) 308.

In some implementations, the memory 310 may include a dictionary generation module 324 and a test module 326. The data storage 316 may store a dictionary data structure 328. The dictionary generation module 324 may perform operations to analyze the document(s) 108 to identify one or more test data elements present in the document(s) 108. The dictionary data structure 328 may be generated or updated to include the identified test data element(s). The test module 326 may employ the dictionary data structure 328 to perform a dictionary attack against one or more software modules. In some cases, the software module(s) may be built from the document(s) 108. For example, the software module(s) may be built by compiling the source code file(s) 110 or linking the object code file(s) 112. During the dictionary attack, one or more sets of the test data elements in the dictionary data structure 328 may be provided to an executing software module to request access to secure feature(s) of the software module. For example, the test data element(s) may be employed as a username, a password, or other credentials to request access. The test data element(s) that enable access to the secure features of a software module may be identified as hard-coded sensitive information such as hard-coded usernames, passwords, or other credentials. In some implementations, the memory 310 may also include a document modification module 330 that modifies the document(s) 108 that are determined to include hard-coded sensitive information. Such modifications may include editing the document(s) 108 to delete or comment out the sensitive information, or replacing the sensitive information with non-sensitive information. The dictionary-based analysis to identify hard-coded sensitive information is described further with reference to FIGS. 10-16.

Figure 4:
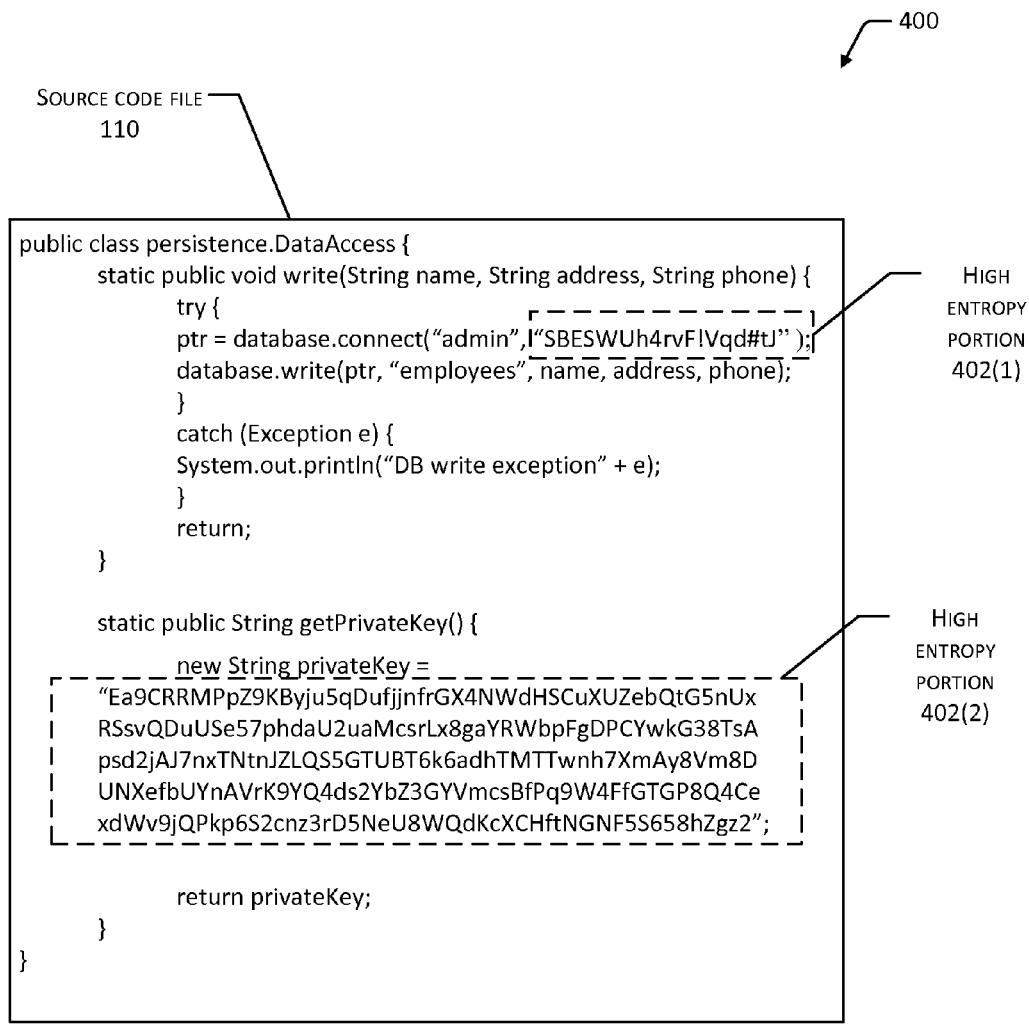
FIG. 4 depicts an example document comprising source code that includes one or more high entropy portions corresponding to hard-coded sensitive information.

FIG. 4 depicts a schematic of an example document 400. In this example, the document 108 is a source code file 110, comprising source code that includes one or more high entropy portions 402 corresponding to hard-coded sensitive information. In this example, the author of the source code file 110 has hard-coded two instances of sensitive information that may be identified as high entropy portions 402 by the user device entropic analysis module 116 or the entropic analysis module 124. The high entropy portion 402(1) corresponds to a password that has been hard-coded into the source code file 110. The high entropy portion 402(2) corresponds to at least a portion of a private key that has been hard-coded into the source code file 110. In each case, the high degree of randomness of the hard-coded sensitive information may enable such information to be identified as high entropy portions 402.

The entropy-based analysis may identify the high entropy portion(s) 402 as potentially secure information, or other types of sensitive information. Alternatively, the high entropy portion(s) 402 may be identified as portion(s) of interest to be further investigated by one or more of the users 104 or by other personnel to determine whether the portion(s) of interest are security risks. In some cases there may be appropriate software development practices that include the hard-coding of digital certificates into source code. For example, when attackers are attempting to compromise security that is based on SSL or TLS, they may attempt to compromise the certificate granting authority itself. In such cases, a developer may hard-code a certificate into source code to confirm that a certificate received from the granting authority is legitimate and that the authority has not been compromised. The hard-coded certificate may be replaced with a subsequently issued certificate if it is known that the issuing authority is trustworthy. In such cases, subsequent investigation may reveal that the hard-coding of the high entropy information was appropriate and does not present a security risk.

Figure 5:
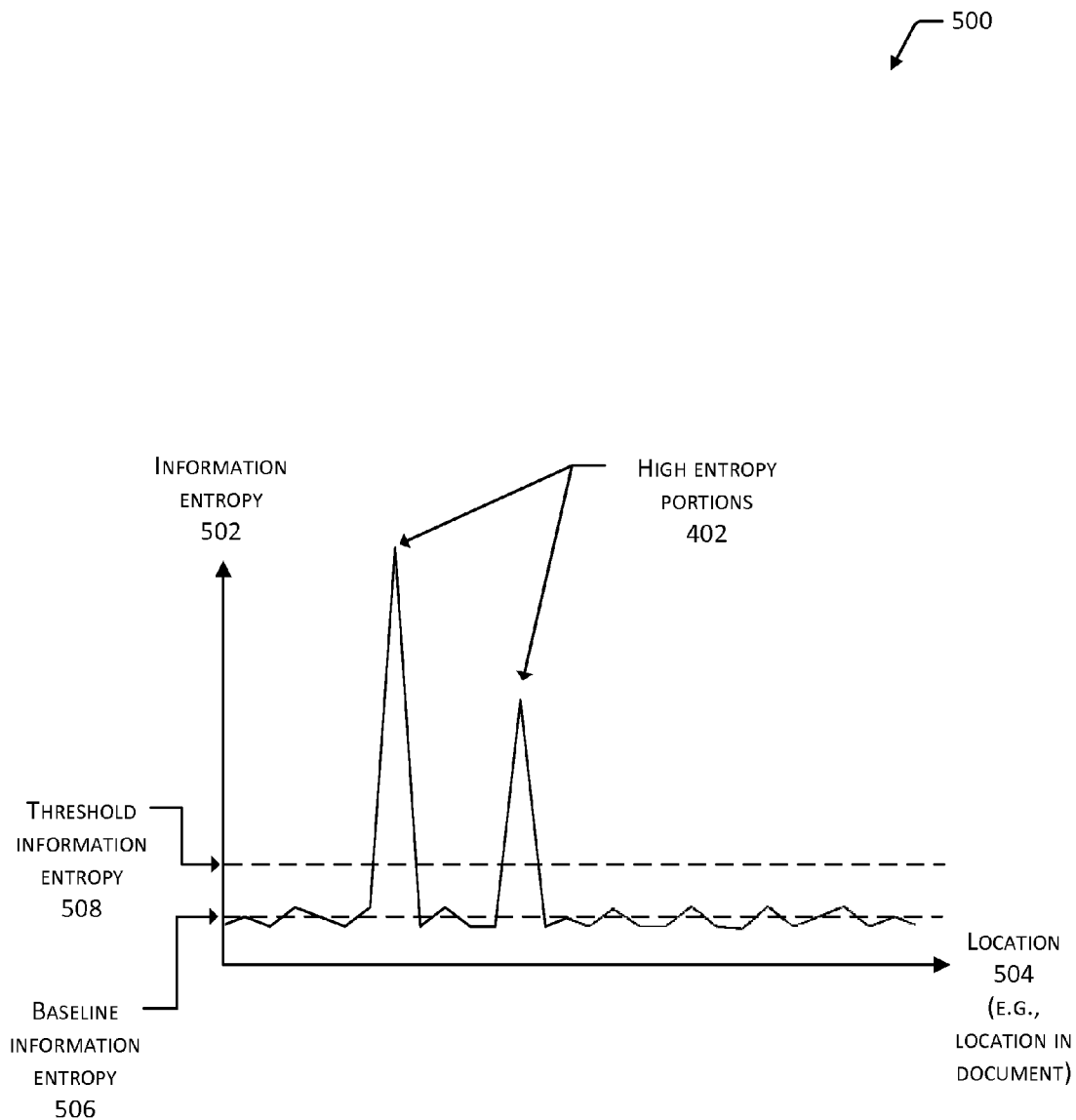
FIG. 5 depicts a graph showing information entropy as a function of the location in an analyzed document such as a source code file.

FIG. 5 depicts a graph 500 showing information entropy 502 plotted as a function of location 504, such as the location in an analyzed document 108. In this example, the information in the document 108 exhibits a baseline information entropy 506. The baseline information entropy 506 may be an average, a mean, a median, or some other statistical measure of an overall information entropy of the information in the document 108. In some implementations, a threshold information entropy 508 may be determined based on the baseline information entropy 506, or based on other criteria. Those portions of the document 108 having an information entropy 502 that meets or exceeds the threshold information entropy 508 may be identified as the high entropy portions 402. Determination of the baseline information entropy 506 and the threshold information entropy 508 is described further with reference to FIG. 7.

Figure 6:
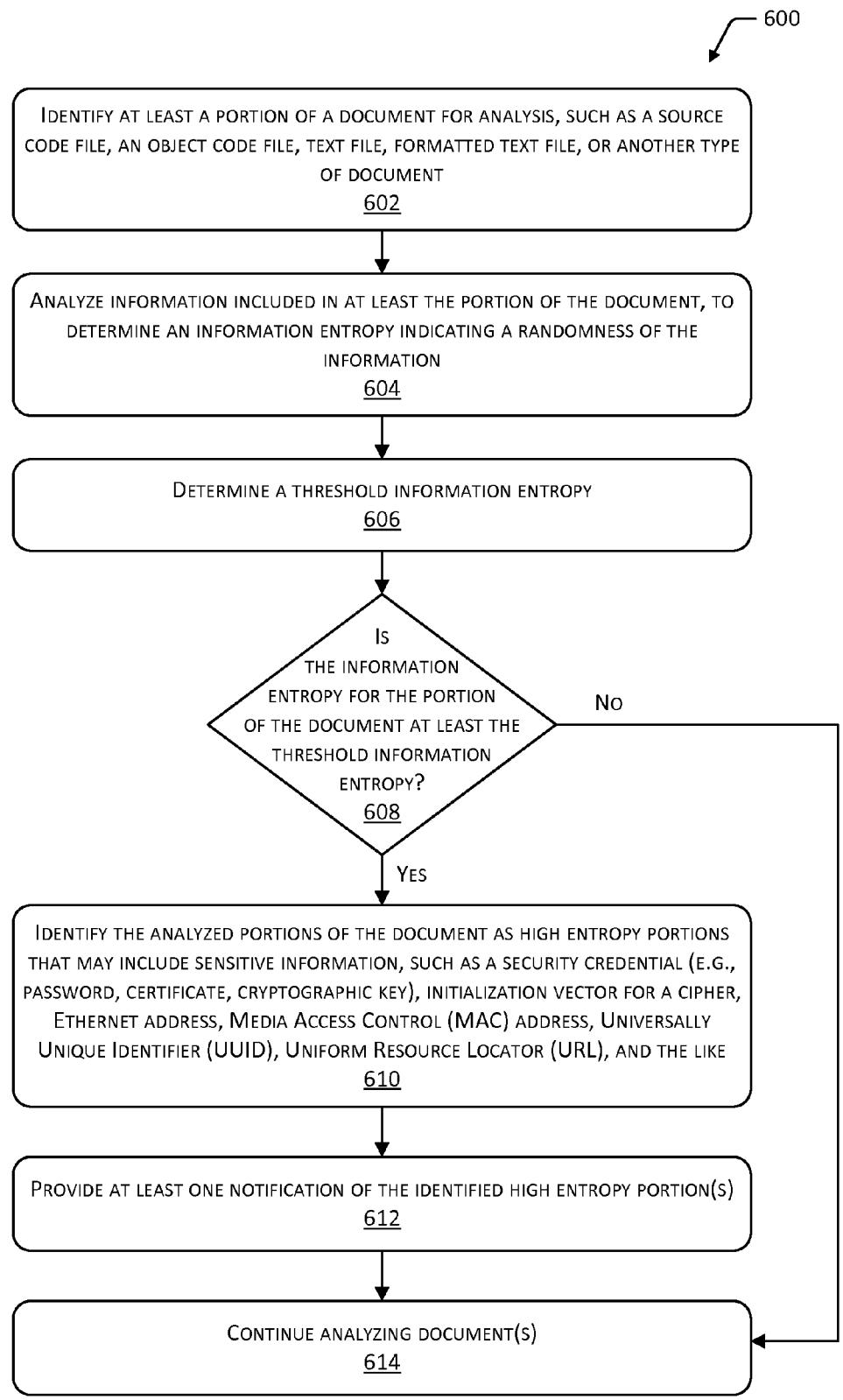
FIG. 6 depicts a flow diagram of a process for analyzing one or more documents to identify any portions of the document(s) that have a high information entropy relative to a threshold information entropy.

FIG. 6 depicts a flow diagram 600 of a process for analyzing one or more documents 108 to identify any portions of the document(s) 108 that exhibit a high information entropy 402 relative to a threshold information entropy 508. Operations of the process may be performed by the user device entropic analysis module 116 executing on the user device(s) 102, by the entropic analysis module 124 executing on the development server device(s) 120, or by the user device entropic analysis module 116 and the entropic analysis module 124.

At 602, at least a portion of a document 108 is identified to be analyzed. In some cases, an entire document 108 such as a source code file 110, an object code file 112, or another document 114 such as a formatted or unformatted text file may be analyzed to identify high entropy portions. Alternatively, any part of the document 108 may be analyzed. In some implementations, those parts of the document 108 that have been changed since a previous analysis may be re-analyzed to identify any high entropy portions that may have been added since the previous analysis. In some cases, the document 108 to be analyzed may be one of a plurality of documents 108, such as the documents 108 that comprise a source code tree managed by the document repository module 122.

At 604, the information included in at least a portion of the document 108 may be analyzed, to determine an information entropy of that portion of the document 108. As described above, the information entropy may indicate a degree of randomness in the information. The information entropy may be measured using various methods, and may be expressed in various units of measure, such as bits per character. In some implementations, the information entropy is measured as a Shannon entropy.

At 606, a threshold information entropy is determined, based on a baseline information entropy or based on other criteria. The determination of the threshold information entropy is described further with reference to FIG. 7.

At 608, a determination is made whether the information entropy of the analyzed portion(s) of the document 108 surpasses the threshold information entropy. If not, then the process may proceed to 614. If so, then the process may proceed to 610.

At 610, the portion(s) of the document 108 determined to have a high information entropy compared to the threshold information entropy may be identified as high entropy portion(s) 402 or portions of interest that potentially include sensitive information. As described above, sensitive information may include secure information, such as one or more of a password, a certificate, a cryptographic key, an initialization vector for a cipher, an Ethernet address, a MAC address, a UUID, a URL, and so forth.

At 612, at least one notification 118 is provided to one or more users 104, describing the identified high entropy portions of the analyzed document 108. In some cases, the notification(s) 118 may be provided through the development environment module 106 executing on the user device(s) 102. For example, an entropy-based analysis of source code may be performed as the user 104 is typing the source code into the development environment module 106. In such cases, the notification 118 may be in the form of a warning, alert, error, or some other indication that one or more high entropy portions have been identified in the source code. Such notifications 118 may be described as real time notifications, and are described further with reference to FIG. 8. Alternatively, the notification(s) 118 may be sent as emails, text messages, or other communications from one or both of the user device(s) 102 and the development server device(s) 120, and may be sent following a check-in or a build of the source code. Such notifications are described further with reference to FIG. 9.

At 614, the process may continue analyzing the document(s) 108, to identify any additional high entropy portions that may be present in the document(s) 108.

Figure 7:
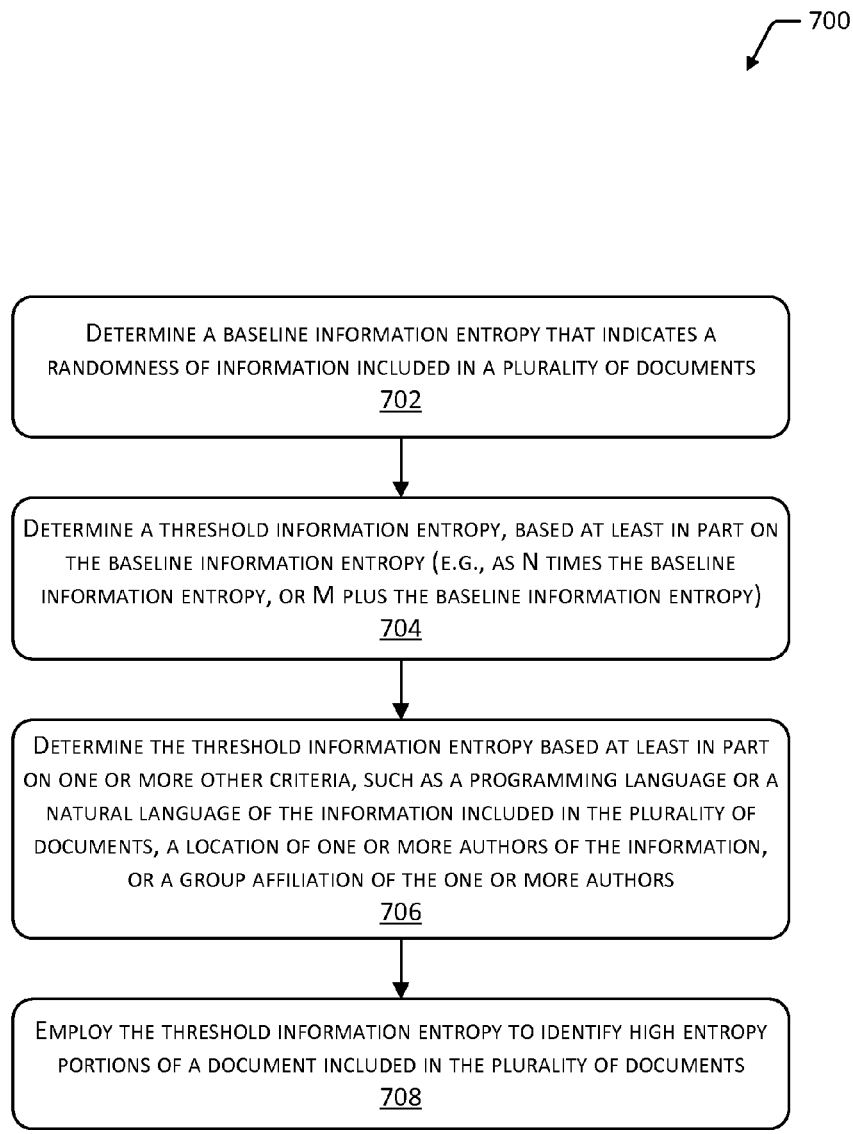
FIG. 7 depicts a flow diagram of a process for determining a threshold information entropy based on a baseline information entropy for one or more documents, or based on other criteria.

FIG. 7 depicts a flow diagram 700 of a process for determining a threshold information entropy 508 based on a baseline information entropy 506 for one or more documents 108, or based on other criteria. Operations of the process may be performed by the user device entropic analysis module 116 executing on the user device(s) 102, by the entropic analysis module 124 executing on the development server device(s) 120, or by the user device entropic analysis module 116 and the entropic analysis module 124.

At 702, a baseline information entropy 506 may be determined based on analyzing information in at least a portion of one or more documents 108. The baseline information entropy 506 may be calculated as an average, a mean, or another statistical measure of the overall information entropy in one or more documents. In some cases, the baseline information entropy 506 may be based on a plurality of documents that include the document 108 that is to be examined for high entropy portions 402. For example, the document 108 to be examined may be one of a plurality of documents that describe one or more computer programs, and that constitute a source code tree managed by the document repository module 122. All of the source code tree, or a portion of the source code tree, may be analyzed to determine the baseline information entropy 506. The baseline information entropy 506 may also be based on a plurality of documents that describe a same program module or a same computer program, a plurality of documents produced by a same development organization, or other sets of documents. In some cases, the baseline information entropy 506 may be based on the information in the document 108 that is to be examined for high entropy portions 402.

In some implementations, the baseline information entropy 506 may be periodically updated. For example, a scheduled process may execute nightly, weekly, or at other scheduled times to recalculate the baseline information entropy 506 for one or more documents 108. The baseline information entropy 506 may be stored as the baseline information entropy data 318, for use in subsequent entropy-based analyses of the document(s) 108.

At 704, a threshold information entropy 508 may be determined based at least in part on the baseline information entropy 506 calculated at 702. In some implementations, the threshold information entropy 508 may be mathematically related to the baseline information entropy 506. For example, the threshold information entropy 508 may be N times the baseline information entropy 506, where N is a predetermined multiplicative factor or multiplicative constant. Alternatively, the threshold information entropy 508 may be M plus the baseline information entropy 506, where M is a predetermined additive factor or additive constant. In some implementations, a statistical variance, spread, standard deviation, or other measure of the distribution of the baseline information entropy 506 may be calculated, and the threshold information entropy 508 may be N times the measured variance. The threshold information entropy 508 may be set at a level such that inaccurate identifications (e.g., false positives) of high entropy portions 402 are minimized.

At 706, the threshold information entropy 508 may be determined based on one or more other criteria. Such criteria may include a programming language for source code in the document(s) 108 being examined, or a natural language of information in the document(s) 108 being examined. Various programming languages and natural languages may exhibit various information entropies overall. For example, the information entropy of a natural language such as English may vary between 0.5 and 1.5 bits per character over a corpus of information expressed in that language. Because structured languages such as programming languages may exhibit a higher degree of structure, and therefore a lower degree of randomness, such structured languages may exhibit a lower level of information entropy than that of a natural language.

The threshold information entropy 508 may also be based at least in part on a physical location of one or more authors of the document(s) 108 being examined. For example, developers in one part of the world may, due to cultural or other differences, tend to generate source code that exhibits a different level of information entropy than code generated by developers in another part of the world. Moreover, the threshold information entropy 508 may also be based on a group affiliation of the author(s) of the document(s) 108 being examined, because certain development teams or other organizations may share a coding style that affects the information entropy of the code they write. The threshold information entropy 508 determined at 704 and 706 may be stored as the threshold information entropy data 320.

Implementations also support the use of other information to determine the threshold information entropy 508. Such other information may include, but is not limited to, one or more of the following: the age of the author of the document(s) 108 being analyzed; the natural language(s) spoken or otherwise employed by the author; the education level achieved by the author; the age of the intended recipient(s) or intended reader(s) of the document(s) 108; the education level achieved by the intended recipient(s) or intended reader(s); the device used by the author to compose the document(s) 108 (e.g., a smartphone compared to a laptop or desktop computer); a format of the document(s) 108 (e.g., an email, short message, or text message compared to a longer document); or a particular time or date when the document(s) 108 were composed. Such factors may alter the entropy of the document(s) 108. For example, an author who is younger or less educated (or who is writing to a younger or less educated reader or recipient) may compose a document 108 that includes fewer unique words or less complicated language, such that the document 108 has a lower entropy overall. As another example, a document 108 composed using a device with limited input capabilities (e.g., a smartphone) may include simpler language than a document 108 composed using a device with more extensive input capabilities (e.g., a laptop or desktop computer), leading to an entropy difference. In some cases, the age or education level of the author, the intended recipient, or the intended reader may be estimated based on other information stored regarding the author, recipient, or reader, such as demographic information.

At 708, the threshold information entropy 508 may be employed to identify any high entropy portions 402 that are present in the document 108 being examined, as described above. In some implementations, the threshold information entropy 508 may be adjusted over time to minimize false positives or inaccurate identifications of high entropy portions 402 of document(s) 108.

In some implementations, supervised or unsupervised machine learning techniques may be employed to determine the threshold information entropy 508, instead of or in addition to the other techniques described with reference to FIG. 7. For example, machine learning techniques may employ training data describing previously analyzed document(s) 108 and previously identified high entropy portions 402. The training data may be employed to train one or both of the user device entropic analysis module 116 and the entropic analysis module 124 to more reliably identify high entropy portions 402 that may constitute security risks in the document(s) 108.

In some implementations, the threshold information entropy 508 may be determined independently of any calculation of the baseline information entropy 506. The threshold information entropy 508 may be selected by a user 104, an operator of the development server device(s) 120, or some other user. In such cases, the threshold information entropy 508 may be tuned or otherwise adjusted over time based on results of one or more entropy-based analyses of the document(s) 108. For example, if analyses are producing false positive identifications of high entropy portion(s) 402 of documents 108, the threshold information entropy508 may be increased to reduce the number of such false positive identifications. Moreover, the threshold information entropy 508 may be lowered if high entropy portion(s) 402 are going undetected during the entropy-based analyses.

Moreover, in cases where the information entropy is calculated as inversely proportional to a frequency of words or strings in the document(s) 108 as described above, the threshold information entropy 508 may be associated with the information entropy of words or strings that occur a small number of times, or that occur once, within one or more of the documents 108. In such cases, the threshold information entropy 508 may be set at or just below the information entropy value for a singularly or rarely occurring string or word.

Figure 8:
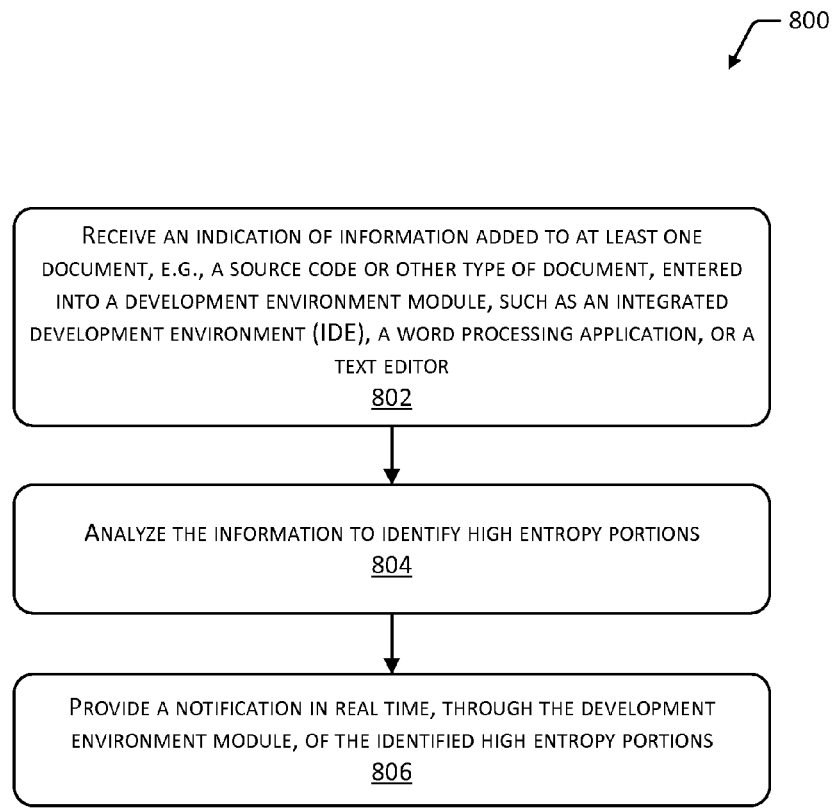
FIG. 8 depicts a flow diagram of a process for providing a notification of one or more high entropy portions of a document, in real time as the document is being written or generated.

FIG. 8 depicts a flow diagram 800 of a process for providing a notification 118 of one or more high entropy portions 402 of a document 108, in real time as the document 108 is being written or generated. Operations of the process may be performed by the user device entropic analysis module 116 executing on the user device(s) 102, by the entropic analysis module 124 executing on the development server device(s) 120, or by the user device entropic analysis module 116 and the entropic analysis module 124.

At 802, an indication is received of source code, object code, formatted or unformatted text data, or other information added to at least one document 108. For example, an indication may be received of source code added to a source code file 110 while it is being edited or created by a developer using the development environment module 106.

At 804, the information may be analyzed to identify any high entropy portions 402 of the information, as described above.

At 806, one or more notifications 118 may be provided that describe the identified high entropy portions 402 of the document being edited. In some cases, the notifications 118 may be provided in real time, at a time that is substantially concurrent with the addition of the information into the document 108 being edited. For example, a developer editing a source code file 110 may type in a security credential such as a password, a cryptographic key, or a certificate, or some other type of high entropy information, to code the credential into the source code file 110. As the developer is typing the credential, or shortly thereafter, a graphical indication may be displayed indicating the credential as a high entropy portion 402 of the document 108. Such an indication may be a presentation of a wavy colored line under the credential in a text editor window, a highlight of the credential, or a displayed message indicating that the user 104 has typed in high entropy information. The indication may be an alert or warning that provides a description of the potentially sensitive information that has been added to the source code file 110. Alternatively, the indication may be an error that prevents compilation of the source code file 110 until the high entropy information has been edited or removed.

As used herein, the term real time describes an event or process that is performed concurrently with, or within a short time period of, another event or process. Because the indication at 806 is provided at approximately the same time as the user 104 has entered the information into the edited document 108, or shortly thereafter, the notification 118 may be described as a real time notification, presented substantially concurrently with the entry of the information into the document 108. Alternatively, the notification 118 may be provided following an attempted compilation or save of the source code file 110 being edited.

Figure 9:
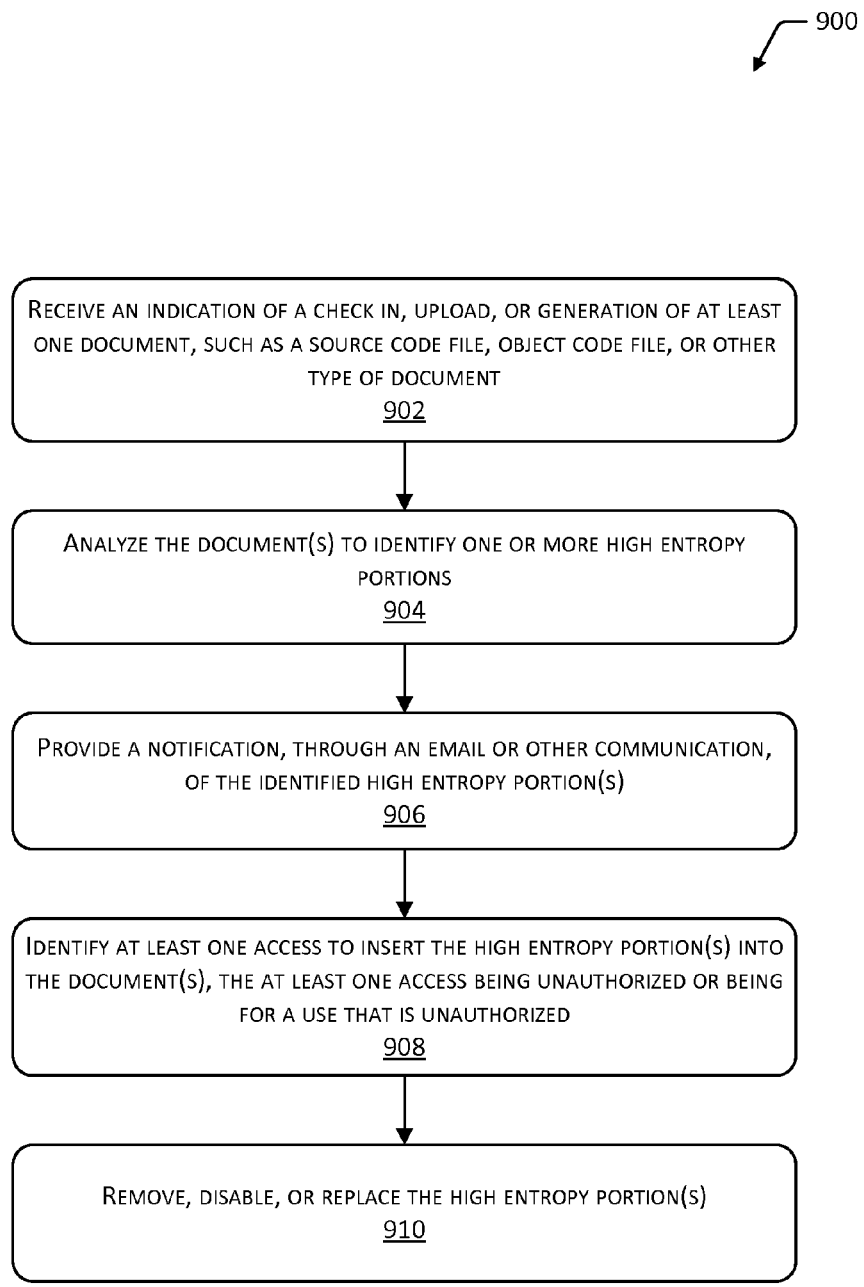
FIG. 9 depicts a flow diagram of a process for providing a notification of one or more high entropy portions of a document, during subsequent processing of the document.

FIG. 9 depicts a flow diagram 900 of a process for providing a notification 118 of one or more high entropy portions 402 of a document 108, the notification 118 provided subsequent to a check-in, upload, or other generation of the document 108. Operations of the process may be performed by the user device entropic analysis module 116 executing on the user device(s) 102, by the entropic analysis module 124 executing on the development server device(s) 120, or by the user device entropic analysis module 116 and the entropic analysis module 124.

At 902, an indication is received of at least one document 108 that has been checked in, uploaded, generated, or otherwise made available to the user device, entropic analysis module 116 or the entropic analysis module 124. In some cases, the indication may be of a source code file 110 or other type of document 108 checked into the document repository module 122. Alternatively, the indication may be of a source code file 110 or other type of document 108 that has been saved following one or more edits through the development environment module 106. The indication may also be of an object code file 112 that has been newly built by the build module 126 or compiled by the development environment module 106.

At 904, the document(s) 108 are analyzed to identify any high entropy portions 402 that are present in the document(s) 108, as described above.

At 906, one or more notifications 118 such as the notification(s) 118 may be provided describing the identified high entropy portion(s)402. Such notifications 118 may be provided as emails, text messages, or other types of communications to a user 104 that authored the information that includes the high entropy portion(s) 402. Notifications 118 may also be provided to other users 104, such as program managers, supervisors, testers, build managers, or others. In some cases, the notifications 118 may include the entry of bug reports or tickets into a bug-tracking or issue-tracking system.

In some implementations an entropy-based analysis may be performed to detect instances in which a person, a process, or some other entity has gained access to the document repository module 122, or another module of the user device(s) 102 or the development server device(s) 120, and inserted obfuscated malware, unauthorized data, or malicious information into one or more documents 108. In such cases, the access itself may be unauthorized, or the access may have been authorized for types of uses other than that of the detected access. An entropy-based analysis may be performed to detect unauthorized information (e.g., malware) inserted into one or more source code files 110, object code files 112 or other document(s) 114. The unauthorized information may exhibit a different information entropy than authorized information, and the unauthorized information may be identifiable based on this difference.

At 908, an identification is made of at least one access to insert the identified high entropy portion(s) 402 into the one or more documents 108, the at least one access being unauthorized or being for a use that is unauthorized.

At 910, in some implementations additional actions may be taken based on the identification of high entropy portion(s) 402 of one or more documents 108. In some cases, the high entropy portion(s) 402 may be automatically removed from the documents 108. Alternatively, the high entropy portion(s) 402 may be disabled, such as through comments added to the source code file(s) 110. Such disabling may prevent the high energy portion(s) 402 from being compiled into the object code file(s) 112. In some cases, the high entropy portions 402 may be replaced with other information. For example, in cases where a developer has hard-coded security credentials into source code for accessing a system, the identified high entropy portion(s) 402 of the code may be removed and replaced with source code that accesses the system through a more secure method, such as through a secure credential provisioning service. Alternatively, the high entropy portion(s) 402 may be replaced with code that generates a message at compile time or at some other time, the message indicating that the potentially risky code has been replaced.

Implementations may perform an entropy-based analysis of the document(s) 108 at any stage in the development process that generates the document(s) 108. For example, one or more source code files 110 may be analyzed when they are checked into the document repository module 122, and notifications 118 of high entropy portions 402 of the checked in documents may be presented as check-in errors or warnings. The analysis may be performed on all files checked into the document repository module 122, or on a subset of files checked in. For example, files checked into a production branch of a source code tree may be analyzed prior to their inclusion in production code for external release. Alternatively, source code files 110 or object code files 112 may be examined for high entropy portions 402 during or after a build process that generates the object code files 112 from the source code files 110. In such cases, the notifications of high entropy portions 402 may be presented as build warnings or build errors. Moreover, implementations may analyze the object code files 112 such as binary executables provided through an app store or another service, to identify potential security risks present in such files.

The notifications 118 described with reference to FIGS. 8 and 9 may include sufficient information to enable one or more users 104 to investigate the identified high entropy portions 402, to determine whether such portions correspond to sensitive information that may leave a computer program vulnerable to attack. Accordingly, the notifications 118 may include information regarding the names and versions of the source code files 110 or other documents 108 that include the high entropy portion(s) 402. The notifications 118 may also describe the location(s) of the high entropy portion(s) 402 in the document(s) 108, in terms of package names, class names, method names, line numbers, or other location descriptions. The notifications 118 may also include at least an excerpt of the high entropy portion(s) 402.

Although the above examples describe performing an entropy-based analysis of newly edited source code file(s) 110 or other types of document(s) 108, implementations support the use of an entropy-based analysis in other scenarios. For example, implementations may be used to identify potential security risks included in third party code, imported code, inherited code, or legacy code, either in the form of source code or object code.

As another example, an entropy-based analysis may be performed to evaluate the quality of code generated by various users 104, or identify practices of the users 104 that may lead to lower quality code. For example, an overall decrease in the information entropy of code over time may indicate that one or more developers may be copying sections of code in multiple program modules, instead of more efficiently refactoring the copied code as a shared library. In some cases, the tracking of an overall information entropy of one or more source code files 110 may indicate that one or more developers are including too many or too few comments in their code, given that the natural language used in comments may tend to have a different information entropy than the programming language used to write the source code.

Figure 10:
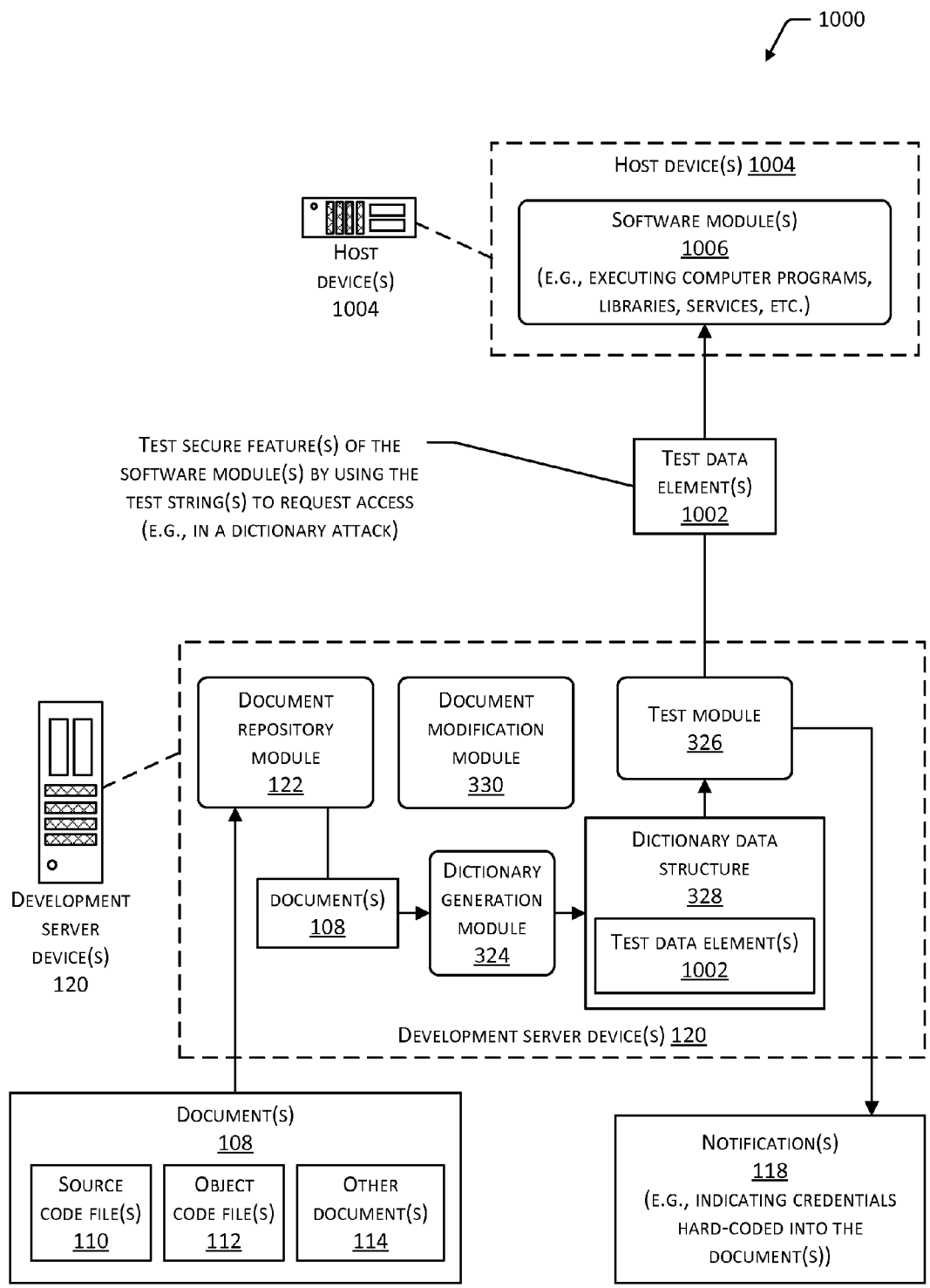
FIG. 10 depicts an environment including one or more development server devices configured to perform operations to generate a dictionary that includes data elements (e.g., strings) present in document(s), and to employ the dictionary in a dictionary attack against software module(s) to detect hard-coded sensitive information (e.g., credentials).

FIG. 10 depicts an example environment 1000 including one or more development server devices 120 configured to perform operations to generate the dictionary data structure 328, and to employ the dictionary data structure 328 to test, probe, or attempt access to secure feature(s) of computer programs, libraries, services, or other types of software module(s). The elements of the environment 1000 may be similarly configured or may perform similar functions to like-numbered elements of the environment 100.

As described with reference to FIG. 1, the development server device(s) 120 may execute the document repository module 122 which receives the document(s) 108. The document(s) 108 may include the source code file(s) 110, the object code file(s) 112, or the other document(s) 114 such as emails, text messages, other communications, other types of formatted or unformatted text files, and so forth. The document(s) 108 may also include configuration files employed during the building (e.g., compiling and linking) of the source code file(s) 110 and the object code file(s) 112, such as makefiles, resource files, and so forth. In some cases, the document repository module 122 may comprise a source control system that provides for the storage and auditing of the document(s) 108 produced by members of a software development organization.

The dictionary generation module 324 may execute on the development server device(s) 120. In some implementations, the dictionary generation module 324 may retrieve one or more documents 108 from the document repository module 122, and analyze the document(s) 108 to identify one or more test data elements 1002 present in the document(s) 108. The test data element(s) 1002 may be incorporated into the dictionary data structure 328 stored on the development server device(s) 120. The generation of the dictionary data structure 328 is described further with reference to FIGS. 13-15. An example dictionary data structure 328 is described with reference to FIG. 11. The test data element(s) 1002 may include strings identified in the document(s) 108. The test data element(s) 1002 may also include other types of data, such as integer, binary, floating point, or double numeric data, and so forth.

In some implementations, the environment 1000 may include one or more host devices 1004 that execute one or more software modules 1006. The host device(s) 1004 may include any type of computing device, including but not limited to any of the computing devices described with reference to the user device(s) 102 and the development server device(s) 120. The software module(s) 1006 may include any type of executable software, including but not limited to computer programs, scripts, executable libraries, services with interfaces that are accessible by remote processes or devices, and so forth.

The development server device(s) 120 may execute the test module 326. The test module 326 may perform operations to access the dictionary data structure 328 and employ one or more of the test data elements 1002 to perform a dictionary attack against secure feature(s) of the software module(s) 1006. During a dictionary attack the test module 326 may provide one or more test data elements 1002, or one or more sets of the test data element(s) 1002, to request access to the software module(s) 1006 or the host device(s) 1004. For example, the test module 326 may submit various combinations of the test data element(s) 1002 as pairs of username (e.g., login, nickname, profile name, gamer tag, etc.) and password to be authenticated by the software module(s) 1006 or the host device(s) 1004. Those test data element(s) 1002 that enable access to the software module(s) 1006 or the host device(s) 1004, may be designated as credential(s) or other types of sensitive information. The notification(s) 118 may be sent to one or more users 104 to indicate that such sensitive information has been detected as data element(s) hard-coded in the document(s) 108. The operations of the test module 326 are described further with reference to FIG. 16.

In some implementations, the development server device(s) 120 may execute a document modification module 330 that modifies the document(s) 108 that are determined to include hard-coded sensitive information. The modifications may include editing the document(s) 108 to delete or comment out the sensitive information, or replacing the sensitive information with non-sensitive information. Such modifications are described further with reference to FIG. 16.

Although FIG. 10 may depict the document repository module 122, the dictionary generation module 324, the test module 326, and the document modification module 330 executing on a same set of one or more development server device(s) 120, implementations are not so limited. Implementations support the execution of individual ones or combinations of the document repository module 122, the dictionary generation module 324, the test module 326, and the document modification module 330 on any number of computing devices. In some implementations, the test module 326 may execute on the host device(s) 1004. In such cases, the notification(s) 118 may be sent to the document modification module 330 to instruct the document modification module 330 to modify the document(s) 108 found to include potentially sensitive information.

The various devices of the environment 1000 may communicate with one another using one or more networks. Such networks may include public networks such as the Internet, private networks such as an institutional or personal intranet, or some combination of private and public networks. The networks may include any type of wired or wireless network, including but not limited to LANs, WANs, WWANs, WLANs, or mobile communications networks (e.g. 3G, 4G, and so forth).

FIG. 11 depicts an example schematic 1100 of the dictionary data structure 328. The dictionary data structure 328 may be arranged in any format or as any type of data structure, including but not limited to a table, a list, a tree, a stack, and so forth. The dictionary data structure 328 may include any number of records (e.g., rows). Each record may comprise a test data element 1002. A record may include one or more host device identifiers 1102 that identify one or more host device(s) 1004. The host device identifier(s) 1102 may include a host name, a network address, or a Uniform Resource Identifier (URI) such as a Uniform Resource Name (URN) or a Uniform Resource Locator (URL) of the host device(s) 1004. The host device identifier(s) 1102 may also include a MAC address, a processor identifier, or some other unique device identifier for the host device(s) 1004. In some cases, the host device identifier(s) 1102 may identify the host device(s) 1004 that are associated with the document 108 in which the test data element 1002 was found. For example, the document 108 may be a source code file 110 that is compiled to build a software module 1006, and information from a software build or deployment system may indicate that the software module 1006 executes on one or more particular host device(s) 1004.

In some cases, the host device identifier(s) 1102 associated with a test data element 1002 may be determined based on context information from the document 108 where the test data element 1002 was found. For example, the test data element 1002 may be present in a source code file 110 in proximity to another data element such as a URL, network address, or hostname that identifies a host device 1004. In such cases, an inference may be made that the test data element 1002 is associated with the host device 1004, e.g., as a credential to access the host device 1004 or to access the software module 1006 executing on the host device 1004. In some implementations, the host device identifier(s) 1102 may be employed to determine which host device(s) 1004 are to be targeted in a dictionary attack using the test data element 1002.

The record for a particular test data element 1002 may also include one or more results 1104 of previous attempt(s) to employ the test data element 1002 to access the software module(s) 1006. Such result(s) 1104 may indicate that previous attempts were successful or unsuccessful. In some implementations, the result(s) 1104 may be employed to determine whether a particular test data element 1002 is to be used in a dictionary attack to attempt access to a software module 1006. For example, the result(s) 1104 indicate that a previous attempt to access the software module 1006 was unsuccessful using the test data element 1002, such that the test data element 1002 may have been determined to not include sensitive information. In such cases, subsequent dictionary attacks may opt not to attempt access again using the test data element 1002. Accordingly, the result(s) 1104 may indicate whether the detection of the test data element 1002 in the document(s) 108 was a false positive, e.g., an instance of a data element that is not a hard-coded credential or other sensitive information.

In some implementations, the record may also include a result(s) expiration time 1106 indicating a period of time or an expiration date and time when the result(s) 1104 may no longer be valid. For example, the result(s) 1104 of a dictionary attack using the test data element 1002 may be valid for three months, after which the test data element 1002 may be tested again to determine whether it includes sensitive information.

The dictionary data structure 328 may include any number of records that describe any number of test data elements 1002. Some implementations may employ multiple dictionary data structures 328 to identify sensitive information hard-coded into the document(s) 108. For example, different dictionary data structures 328 may store sets of test data elements 1002 associated with different host device identifiers 1102, such that the various dictionary data structures 328 may be employed to target different host devices 1004. In some implementations, at least a portion of the dictionary data structure 328 may be stored as a hash, as a digest, in an encrypted form, or in an obfuscated form to prevent unauthorized access to or use of the dictionary data structure 328.

Figure 12:
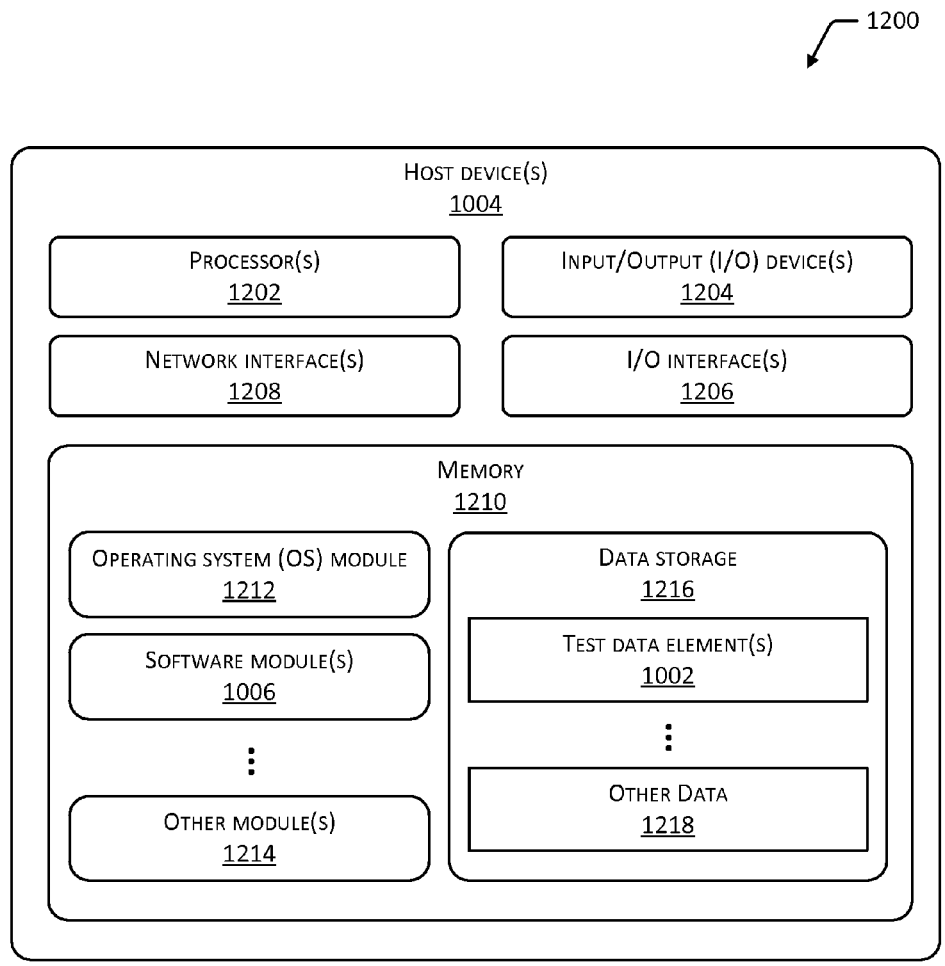
FIG. 12 depicts a block diagram of example host device(s) on which software module(s) may execute.

FIG. 12 depicts a block diagram 1200 of an example of the host device(s) 1004 on which the software module(s) 1006 may execute. As shown in the block diagram 1200, the host device(s) 1004 may include one or more processors 1202 (e.g., hardware-based processor(s)) configured to execute one or more stored instructions. The processor(s) 1202 may comprise one or more cores. The host device(s) 1004 may include one or more I/O devices 1204, one or more I/O interfaces 1206, and one or more network interfaces 1208 as described above respectively with reference to the I/O device(s) 204, the I/O interface(s) 206, and the network interface(s) 208.

The host device(s) 1004 may include one or more memories, described herein as memory 1210. The memory 1210 comprises one or more CRSM, as described above with reference to the memory 210. The memory 1210 may include an OS module 1212 that is configured to manage hardware resources such as the I/O device(s) 1204, the I/O interface(s) 1206, and the network interface(s) 1208, and to provide various services to applications, processes, or modules executing on the processor(s) 1202. The OS module 1212 may include one or more of the operating systems described above with reference to the OS module 212. The memory 1210 may include one or more of the modules described above as executing on the host device(s) 1004, such as the software module(s) 1006. The memory 1210 may also include one or more other modules 1214, such as a user authentication module or an access control module to secure access to the host device(s) 1004, and so forth.

The memory 1210 may include data storage 1216, which may store data for operations of the host device(s) 1004. The data storage 1216 may comprise a database, array, structured list, tree, or other data structure, and may be a relational or a non-relational datastore. The data storage 1216 may store data such as the test data element(s) 1002 used to request access to secure feature(s) of the software module(s) 1006. The data storage 1216 may also store other data 1218, such as user authentication information or access control data. In some implementations, at least a portion of the information stored in the data storage 1216 may be stored externally to the host device(s) 1004, on other devices that may communicate with the host device(s) 1004 via the I/O interface(s) 1206 or via the network interface(s) 1208.

Figure 13:
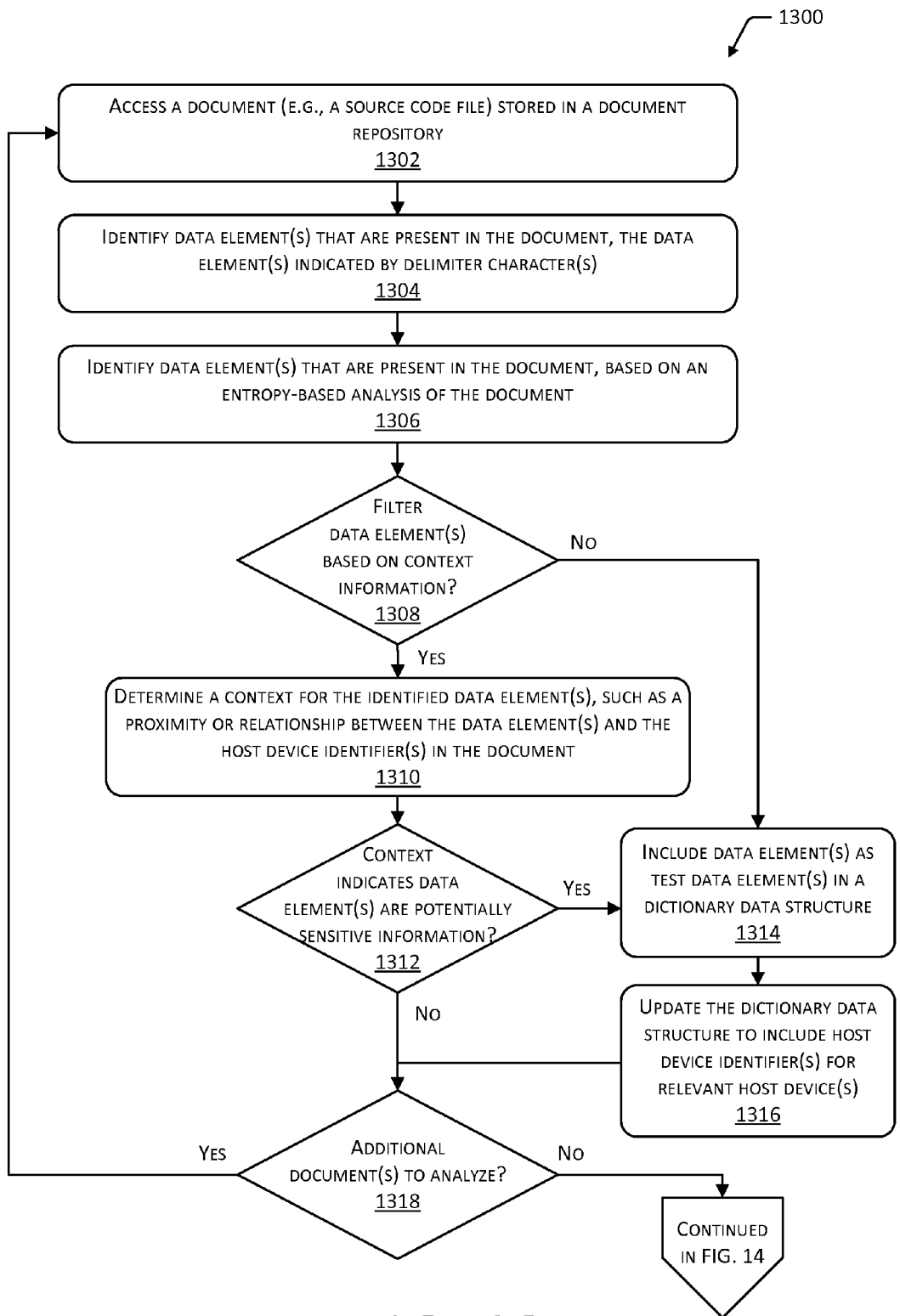
FIG. 13 depicts a flow diagram of a process for generating a dictionary that may be employed to test secure feature(s) of software module(s) to detect hard-coded sensitive information.
Figure 14:
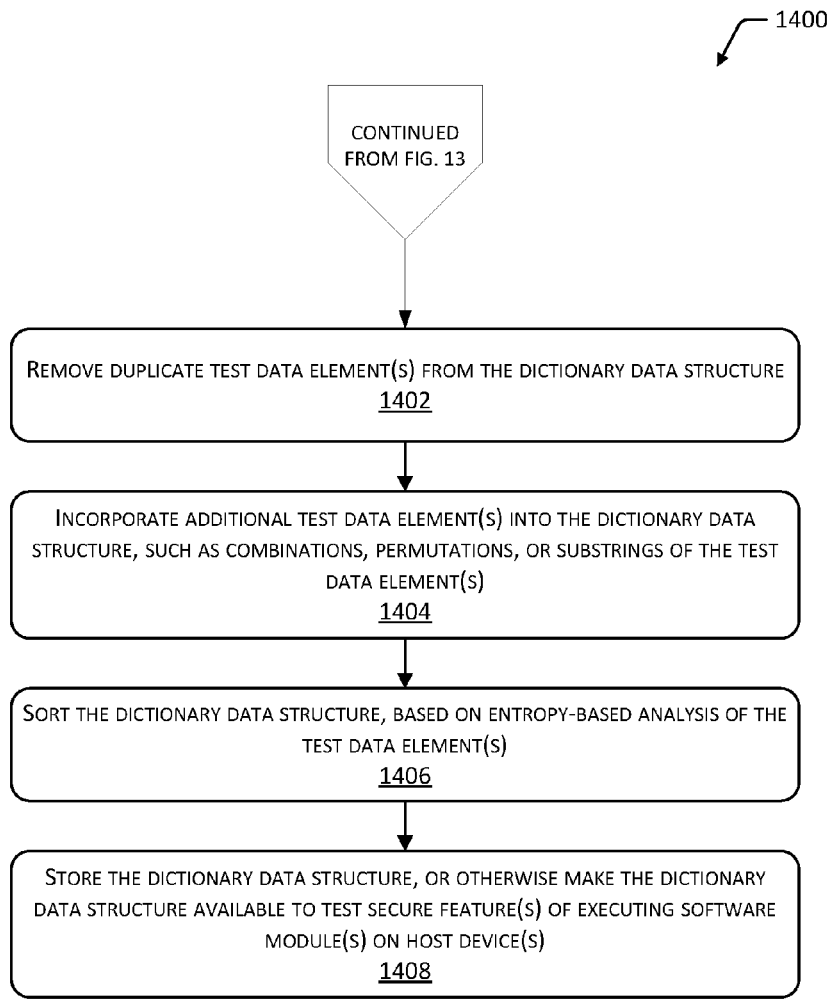
FIG. 14 depicts a flow diagram of a continuation of the process for generating the dictionary that may be employed to test secure feature(s) of software module(s).

FIGS. 13 and 14 depict flow diagrams 1300 and 1400 of a process for generating or updating the dictionary data structure 328 that may be employed to identify hard-coded sensitive information in the document(s) 108. Operations of the process may be performed by one or more of the document repository module 122, the dictionary generation module 324, the test module 326, other modules executing on the development server device(s) 120, or other modules 314 executing on other devices.

At 1302, a document 108 such as a source code file 110, an object code file 112, or other document 114 is accessed. In some cases, the document 108 may be accessed from a document repository module 122.

At 1304, the document 108 may be scanned, searched, or otherwise analyzed to identify one or more data elements that are included in the document 108. In some cases, this analysis may include searching the document 108 for instances of delimiter characters that indicate the presence of the data element(s). For example, in cases where the document 108 is a source code file 110 written in a programming language, the specification of the programming language may designate one or more characters as control characters that delimit a string, such as single quote or double quote characters. Implementations may search for instances of such characters, and identify a data element as the data included between a pair of the delimiter characters or as the data between a delimiter character and an end of line or other control character.

Although examples herein may describe the document 108 as a text file such as a source code file 110, implementations also support the analysis of a document 108 that is in a binary format such as an object code file 112 (e.g., a machine-readable object file or executable). In some cases, an object code file 112 may be obfuscated or encrypted following its generation via compilation of one or more source code files 110. In such cases, the document 108 may be de-obfuscated or decrypted at 1304 prior to scanning the document 108 for data elements.

Moreover, in some implementations the document 108 may be a portion of the memory (e.g., runtime memory or active memory) employed by the executing software module(s) 1006. For example, in cases where the machine-executable binary code or object code of the software module(s) 1006 is obfuscated or encrypted after compilation, the machine-executable binary code or object code may be decrypted or de-obfuscated prior to or during execution. In such cases, the data element(s) included in the source code of the software module(s) 1006 may be accessed from the portion of memory employed by the software module(s) 1006 during execution, after the machine-executable binary code or object code has been decrypted or de-obfuscated.

In some implementations, an entropy-based analysis of the document 108 may be performed in addition to or instead of the analysis performed at 1304. For example, as described above with reference to FIGS. 6 and 7, the document 108 may be analyzed to determine a baseline entropy that indicates a degree of randomness present in the information of the document 108. One or more portions of the document 108 may then be identified as having an entropy that is higher than a threshold entropy, where the threshold entropy is determined based on the baseline entropy. Those portion(s) of the document 108 exhibiting the higher than threshold entropy may then be designated, at 1306, as data element(s) to be included in the dictionary data structure 328.

At 1308, a determination may be made whether context information is to be employed to filter the data element(s) identified at 1304 and 1306. For example, context information may be employed in determining which of the identified data element(s) are to be included as the test data element(s) 1002 in the dictionary data structure 328. If it is determined at 1308 that context information is not to be used, the process may proceed to 1314 and the identified data element(s) may be included as the test data element(s) 1002 in the dictionary data structure 328. If it is determined at 1308 that context information is to be used, the process may proceed to 1310.

At 1310, a context may be determined for the data element(s) identified at 1304 and 1306. In some cases, the context may include a proximity between the data element(s) and one or more host device identifiers 1102 in the document 108. For example, the data element(s) may be in a same class, same method, same code block, same subroutine, or within a predetermined number of lines or characters of a host device identifier 1102. The context may also include other types of relationships between the data element(s) and the host device identifier(s) 1102 in the document 108. For example, a data element may be included in a parameter that is sent to a function, method, or subroutine that includes a host device identifier 1102.

At 1312, a determination is made whether the context indicates that the data element(s) are potentially sensitive information. If so, the process may proceed to 1314 and include the data element(s) as test data element(s) 1002 in the dictionary data structure 328. In some cases, the proximity or relationship between the data element and the host device identifier 1102 in the document 108 may be used to infer that the data element may be a credential or other sensitive information employable to access the host device 1004 or the software module 1006 executing on the host device 1004. In such cases, the data element may be included as a test data element 1002 in the dictionary data structure 328.

After 1314, the process may proceed to 1316 and update the dictionary data structure 328 to include the host device identifiers 1102 for the host device(s) 1004 that are determined to be relevant to or associated with the document 108, as described above with reference to FIG. 11. The process may then proceed to 1318. If, at 1312, a determination is made that the context does not indicate that the data element(s) are potentially sensitive information, the process may proceed to 1318.

At 1318, a determination is made whether there are additional document(s) 108 to be searched, scanned, parsed, or otherwise analyzed. If so, the process may return to 1302 and analyze another document 108. If not, the process may proceed as described with reference to FIG. 14.

At 1402, in some implementations the dictionary data structure 328 may be examined to identify the presence of any duplicate test data elements 1002. Such duplicates may be removed from the dictionary data structure 328.

At 1404, in some implementations the dictionary data structure 328 may be expanded or otherwise modified to include one or more additional test data element(s) 1002. The additional test data element(s) 1002 may be derived from the test data element(s) 1002 already present in the dictionary data structure 328, by combining test data element(s) 1002 or portions of test data element(s) 1002. The additional test data element(s) 1002 may also be generated by permuting the previously determined test data element(s) 1002, such as by adding, removing, or altering one or more characters of the previously determined test data element(s) 1002. In some cases, additional test data element(s) 1002 may be generated by selecting portion(s) (e.g., substrings) of the previously determined test data element(s) 1002.

At 1406, in some implementations the dictionary data structure 328 may be sorted. In some cases, the sorting may be optional based on an operator decision. The sorting may place one or more test data elements 1002 earlier in the dictionary data structure 328 if such test data element(s) 1002 are determined to be more likely to include sensitive information such as credentials. In some implementations, the sorting may result from an entropy-based analysis of the test data element(s) 1002. For example, the test data element(s) 1002 may be analyzed to determine their entropy, as described with reference to FIGS. 6 and 7. Those test data element(s) 1002 exhibiting higher entropy may be placed earlier in the dictionary data structure 328 than other, lower entropy test data element(s) 1002. Accordingly, implementations may employ an entropy calculation to determine which test data element(s) 1002 are more likely to include sensitive information such as passwords, cryptographic keys, certificates, and so forth, and arrange the dictionary data structure 328 to test those test data element(s) 1002 before other test data element(s) 1002. The sorting at 1406 may also be based on the context of the test data element(s) 1002 within the document(s) 108. For example, test data element(s) 1002 may be placed earlier in the dictionary data structure 328 if their context indicates a possible association with a host device 1004.

At 1408, the dictionary data structure 328 may be stored on the development server device(s) 120 or elsewhere, or may be otherwise made available to test the secure feature(s) of executing software module(s) 1006 on host device(s) 1004. Such testing may determine whether the test data element(s) 1002 included in the dictionary data structure 328 are hard-coded sensitive information, as described further with reference to FIG. 16.

Figure 15:
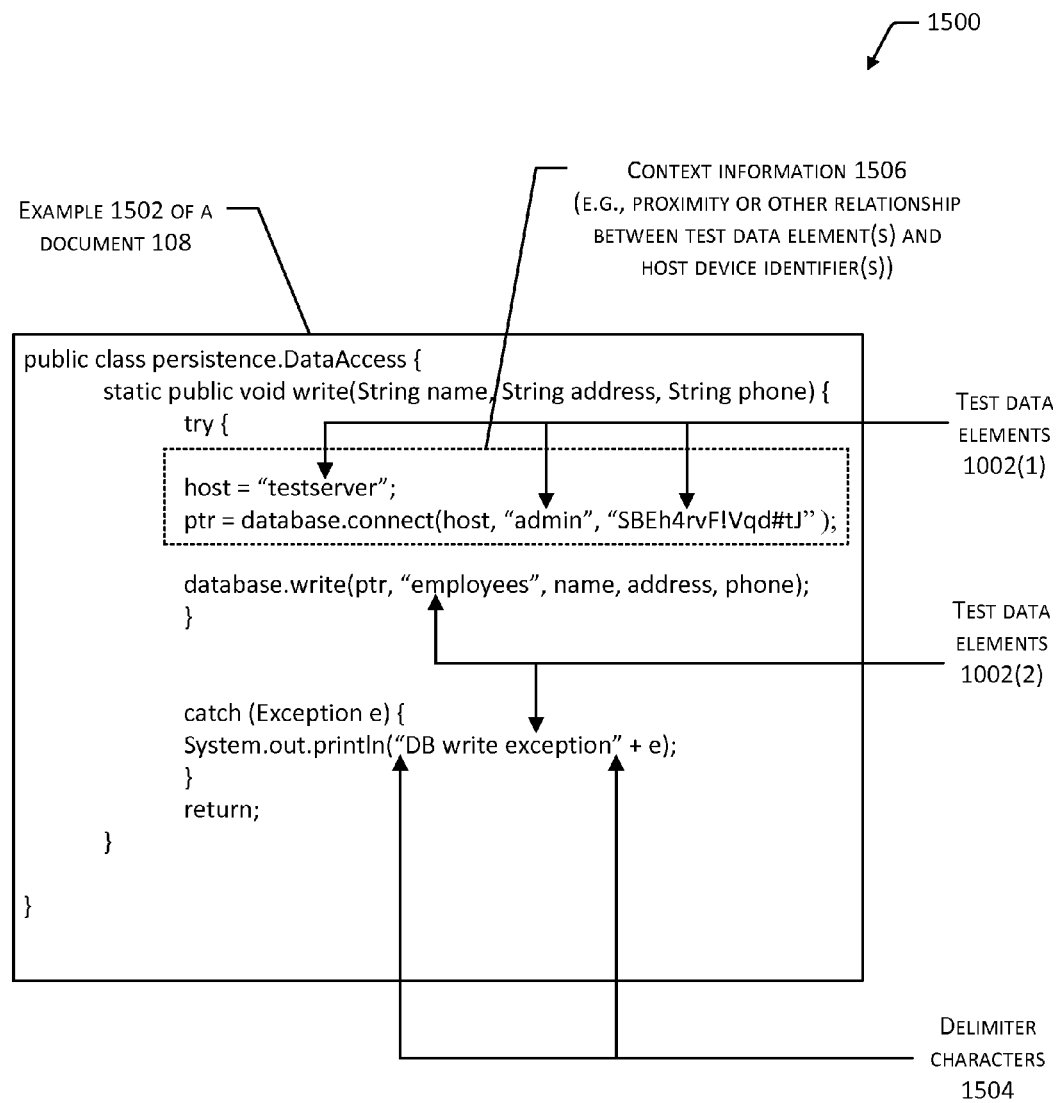
FIG. 15 depicts an example document comprising source code that includes one or more data elements that may be incorporated as test data elements in the dictionary.

FIG. 15 depicts a schematic 1500 of an example 1502 of a document 108 comprising source code that includes one or more data elements that may be incorporated as test data elements 1002 in the dictionary data structure 328. In the example 1502, the source code includes various test data elements 1002 that have been identified based on the presence of delimiter characters 1504. In this example, the delimiter characters 1504 are double quote characters. Implementations also support the use of other delimiter characters 1504 to identify test data elements 1002.

Implementations also support the identification of test data element(s) 1002 within document(s) 108 written in programming languages that do not employ designated delimiter characters. In such cases, parsing or some other type of grammar-based analysis may be performed on the document(s) 108 to identify data elements. In some programming languages, at least some tokens may be converted to data elements at runtime. In such cases, implementations may search the document(s) 108 for the function(s) that perform such a conversion and identify the test data element(s) 1002 based on the search.

The example 1502 also depicts context information 1506 that may be employed to determine which identified data element(s) are included in the dictionary data structure 328 as test data element(s) 1002. In this example, the context information 1506 indicates that two of the test data elements 1002(1) are in proximity (e.g., within a same method, class, or code block) to a third test data element 1002(1) that is a host device identifier 1102. Implementations also support the use of context information 1506 that indicates a call-based relationship or another type of association between the test data element(s) 1002 and the host device identifier(s) 1102. For example, the context information 1506 may indicate that the test data element(s) 1002 are included in parameter(s) sent to a function, method, or subroutine that includes the host device identifier(s) 1102. Alternatively, the host device identifier(s) 1102 may be included in parameter(s) sent to a function, method, or subroutine that includes the test data element(s) 1002. In such cases, the context present in the source code may indicate a possible relationship between the host device identifier(s) 1102 and the test data element(s) 1002 even if the host device identifier(s) 1102 are not near the test data element(s) 1002 in the source code file 110.

Figure 16:
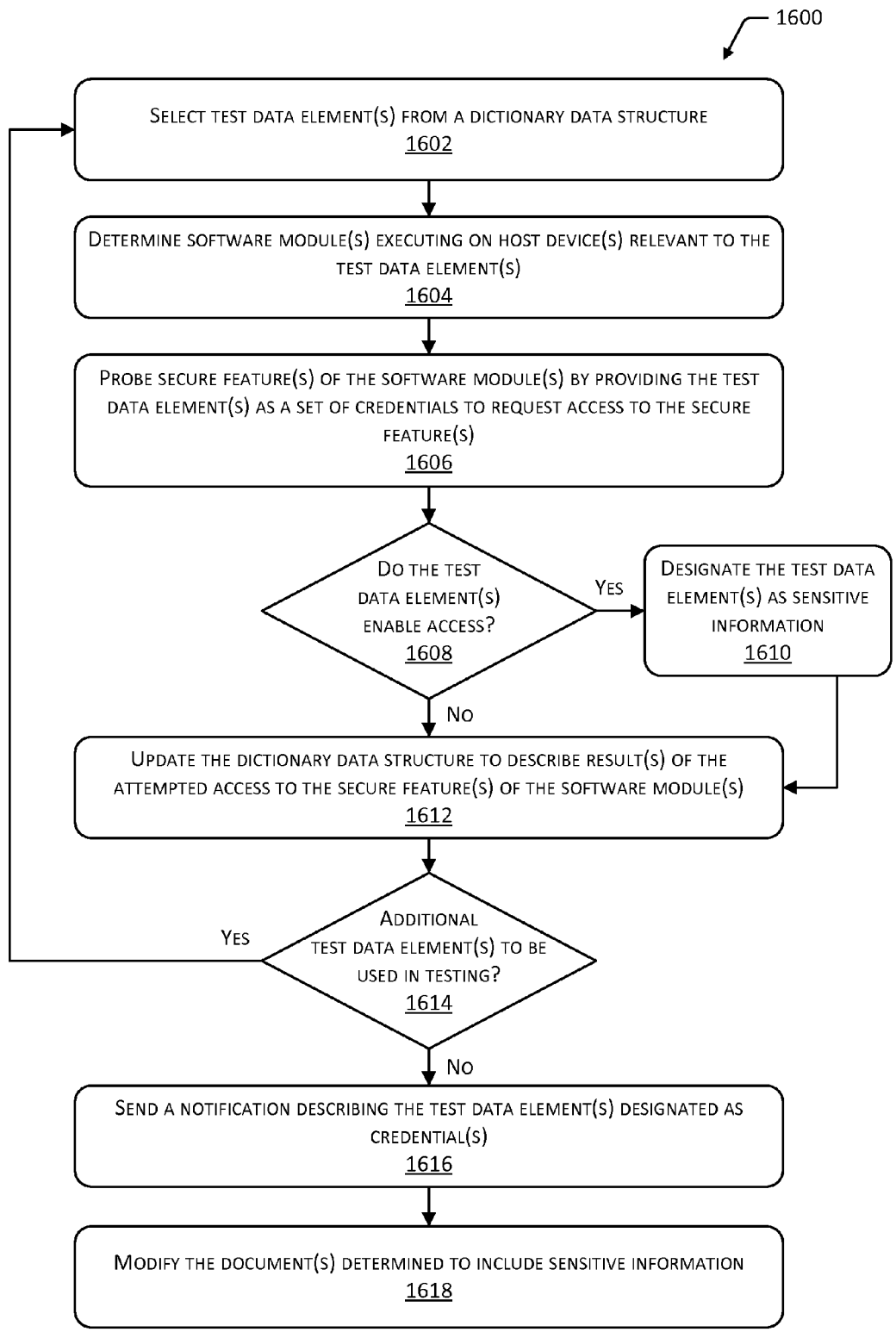
FIG. 16 depicts a flow diagram of a process for employing test data elements(s) in the dictionary to detect hard-coded sensitive information.

FIG. 16 depicts a flow diagram 1600 of a process for employing test data element(s) 1002 in the dictionary data structure 328 to identify hard-coded sensitive information in the document(s) 108. Operations of the process may be performed by one or more of the document repository module 122, the dictionary generation module 324, the test module 326, the document modification module 330, other modules executing on the development server device(s) 120, or other modules executing on other devices.

At 1602, one or more test data elements 1002 may be selected from the dictionary data structure 328. In some cases, a single test data element 1002 may be selected. Alternatively, two or more test data elements 1002 may be selected as a set of test data elements 1002. For example, a pair of test data elements 1002 may be employed as a username and a password to attempt a login to a software module 1006. In some implementations, the selection of test data elements 1002 may be based on their order within the dictionary data structure 328.

At 1604, one or more relevant software modules 1006 or host devices 1004 may be determined. In some cases, the relevant host device(s) 1004 may be determined based on the host device identifier(s) 1102 associated with the selected test data element(s) 1002 in the dictionary data structure 328. Alternatively, implementations may select the more frequently accessed (e.g., higher traffic or more widely deployed) software module(s) 1006 executing on the host device(s) 1004. In some implementations, the relevant software module(s) 1006, the relevant host device(s) 1004, or both the software module(s) 1006 and the host device(s) 1004 may be determined based on metadata included in the document repository module 122 or metadata that is available from a build or deployment service. Such metadata may indicate one or more host devices 1004 where the software module(s) 1006 are to be executed, or may indicate the software module(s) 1006 that are built from the document(s) 108.

At 1606, the secure feature(s) of the software module(s) 1006 may be tested by providing the test data element(s) 1002 to attempt access to the secure feature(s). For example, a set of test data element(s) 1002 may be provided as a set of credentials to request access to the software module(s) 1006. Alternatively, one or more test data element(s) 1002 may be employed (e.g., as a cryptographic key) in a communication handshake to attempt to establish a secure network connection with the software module 1006.

At 1608, a determination is made whether the test data element(s) 1002 enable access to the secure feature(s) of the software module(s) 1006. Such a determination may be made based on response information received from the software module(s) 1006 indicating a success or failure in accessing the secure feature(s). For example, an unsuccessful login attempt using a set of credentials may prompt the software module(s) 1006 to send an error message or other information.

In some cases, the determination at 1608 may be based on an indication, from the software module(s) 1006, that the test data element(s) 1002 potentially provide access to secure feature(s). For example, the test data element(s) 1002 may be provided as a set of credential(s) to request access to the secure feature(s) of the software module(s) 1006. The software module(s) 1006 may respond with an error code indicating that the test data element(s) 1002 would have been accepted as valid credential(s) if they had been sent from a different computing device or if they had been sent at a different time. Such a response may be employed to infer that the test data element(s) 1002 include potentially sensitive information such as credential(s). Further, in some cases the probed software module(s) 1006 may respond with a latency that is different than that of a typical response to invalid credential(s), and the latency difference may be detected to infer that the test data element(s) 1002 include potentially sensitive information. Implementations support the detection of any variation in the behavior of the targeted software module(s) 1006 relative to their behavior in response to invalid credential(s), and such variation may indicate the presence of potentially sensitive information in the test data element(s) 1002.

If the test data element(s) 1002 do not enable access, the process may proceed to 1612. If the test data element(s) 1002 enable access, the process may proceed to 1610 and designate the test data element(s) 1002 as sensitive information such as credential(s). At 1612, the result(s) 1104 in the dictionary data structure 328 may be updated to describe the success or failure of the attempted access at 1608.

At 1614, a determination is made whether there are additional test data element(s) 1002 in the dictionary data structure 328 that may be employed in testing the secure feature(s) of the software module(s) 1006. If so, the process may return to 1602 and select another test data element 1002 or set of test data elements 1002 to be tested. If not, the process may proceed to 1616.

At 1616, a notification 118 may be sent to one or more users to indicate the possible presence of hard-coded credentials or other sensitive information in the document(s) 108. The recipient of the notification 118 may be determined based on metadata indicating users associated with the document(s) 108 in the document repository module 122, such as owners of a particular document 108 or user(s) who recently updated the document 108 that included the test data element(s) 1002 determined to be sensitive information.

At 1618, in some implementations one or more modifications may be made to the document(s) 108 that were determined to include the hard-coded credentials or other sensitive information. Such modification(s) may be made in addition to, or instead of, sending the notification 118 at 1616. The modification(s) may include deleting the potentially sensitive information from the document(s) 108, or replacing the potentially sensitive information with non-sensitive (e.g., random) data. Alternatively, at least a portion of the document(s) 108 that includes the sensitive information may be modified (e.g., commented out) to block the compilation or execution of that section of code. In some cases, the source code may be modified to replace the hard-coded sensitive information with method or procedure calls to a service that stores and provides credentials in a manner that is more secure than hard-coding credentials into source code. Implementations may also perform other actions based on the detection of hard-coded sensitive information in the document(s) 108. In some implementations, a build, deployment, or execution of the software module(s) 1006 may be paused or terminated based on the detection of sensitive information.

In addition to detecting sensitive information hard-coded into the document(s) 108, implementations may also operate to identify instances of coding practices or patterns that are disfavored or disallowed within a software development organization. For example, in some cases it may be disfavored or disallowed to include dynamic code in the source code of a computer program. Such dynamic code (e.g., shell code) may be a string that includes executable code or compilable source code. During execution of a software module 1006, the dynamic code may be accessed and executed to spawn additional process(es) or perform additional operations. Accordingly, implementations may identify data elements that exhibit characteristics of dynamic code, such as a syntax corresponding to a type of assembly language. In some cases, dynamic code may be identified by comparing a data element to the syntax of an assembly language for the target platform of the source code that includes the data element. Alternatively, the context information 1506 may be employed to determine a likely target platform of the dynamic code, e.g., based on the host device identifier 1102 in proximity to the data element in the source code. The syntax of the assembly language supported by that target platform may then be compared to the data element to determine whether the data element includes dynamic code.

Although the examples above may describe performing an entropy-based or dictionary-based analysis of document(s) 108 that include text data or binary (e.g., machine-readable) information, implementations are not so limited. Implementations also support the analysis of document(s) 108 that include other types of information such as audio data, image data, video data, and so forth.

Those having ordinary skill in the art will readily recognize that certain steps or operations illustrated in the figures above may be eliminated, combined, or performed in an alternate order. Any steps or operations may be performed serially or in parallel. Moreover, the methods described above may be implemented as one or more software programs for a computer system and may be encoded in a computer-readable storage medium as instructions executable on one or more processors.

Embodiments may be provided as a computer program product including one or more non-transitory computer-readable storage media having stored thereon instructions (in compressed or uncompressed form) that may be used to program a computer (or other electronic device) to perform processes or methods described herein. The computer-readable storage media may include one or more of an electronic storage medium, a magnetic storage medium, an optical storage medium, a quantum storage medium, and so forth. For example, the computer-readable storage media may include, but are not limited to, hard drives, floppy diskettes, optical disks, read-only memories (ROMs), random access memories (RAMs), erasable programmable ROMs (EPROMs), electrically erasable programmable ROMs (EEPROMs), flash memory, magnetic or optical cards, solid-state memory devices, or other types of physical media suitable for storing electronic instructions. Further, embodiments may also be provided as a computer program product including a transitory machine-readable signal (in compressed or uncompressed form). Examples of machine-readable signals, whether modulated using a carrier or unmodulated, include but are not limited to signals that a computer system or machine hosting or running a computer program may be configured to access, including signals transferred by one or more networks. For example, a transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case and a variety of alternative implementations will be understood by those having ordinary skill in the art.

Additionally, those having ordinary skill in the art readily recognize that the techniques described above can be utilized in a variety of devices, environments, and situations. Although the present disclosure is written with respect to specific embodiments and implementations, various changes and modifications may be suggested to one skilled in the art. It is intended that the present disclosure encompass such changes and modifications that fall within the scope of the appended claims.

What is claimed is:

1. A computer-implemented method, comprising:
   identifying a plurality of strings in a document that includes source code of at least a portion of a software module, the source code described in a programming language, the identifying of the plurality of strings comprising searching the document for individual ones of the plurality of strings that are delimited by one or more string delimiter characters designated by the programming language;
   determining an information entropy associated with the individual ones of the plurality of strings;
   incorporating the individual ones of the plurality of strings with the information entropy at least equal to a threshold information entropy into a dictionary;
   during execution of the software module, performing a dictionary attack on one or more secure features of the software module using the dictionary, the dictionary attack including providing one or more strings of the plurality of strings as a set of test credentials for requesting access to the one or more secure features;
   determining that the providing of the one or more strings enables the access to the one or more secure features of the software module;
   designating the one or more strings as one or more credentials written into the source code; and
   sending a notification describing the one or more credentials written into the source code.

2. The method of claim 1, wherein:
   the identifying of the plurality of strings is further based on determining a context for the individual ones of the plurality of strings in the document;
   the context includes an association between a string and an identification of a host device on which the software module is executable, the association including one or more of:
      a proximity of the string to the identification of the host device in the source code; or
      the string being included in a parameter passed to a portion of the source code that references the identification of the host device; and
   the identification of the host device includes one or more of:
      a Uniform Resource Identifier (URI);
      a network address;
      a media access control (MAC) address;
      a unique device identifier; or
      a hostname.

3. The method of claim 1, wherein the incorporating the individual ones of the plurality of strings with the information entropy at least a threshold information entropy into a dictionary further comprises:
   determining a baseline information entropy that indicates a randomness of information included in a set of documents that includes the document;
   determining that the information entropy of at least one portion of the document is equal to at least the threshold information entropy, the threshold information entropy based at least in part on the baseline information entropy; and
   identifying the at least one portion of the document as at least one of the plurality of strings for incorporating into the dictionary.

4. The method of claim 3, wherein the threshold information entropy is further based on one or more of:
   the programming language used to describe the source code;
   a natural language used in the document;
   an estimated age of an author of the document;
   an estimated education level of the author of the document;
   a format of the document;
   a characteristic of a computing device used to generate the document;
   a location of the author of the document;
   a natural language used by the author of the document;
   a group affiliation of the author of the document;
   an estimated age of a recipient of the document; or
   an estimated education level of the recipient of the document.

5. A system, comprising:
   at least one computing device, comprising:
   memory storing computer-executable instructions; and
   processor, coupled to the memory, the processor configured to execute the computer-executable instructions for implementing one or more services, wherein the one or more services:
      identify, in a document associated with a software module, at least one data element with information entropy at least equal to a threshold information entropy;
      determine at least one host device on which the software module is executable;
      store the at least one data element in a data structure that includes, for individual ones of the at least one data element, a description of the at least one host device on which the software module is executable;
      provide the data structure to the software module;
      determine the provided data element is sensitive information when the data element enables the access to the software module; and
      generate a notification describing the sensitive information in the document.

6. The system of claim 5, wherein the document includes one or more of:
   a source code file including source code for the software module;
   an object code file including object code for the software module;
   a configuration file for building the software module;
   a message including formatted or unformatted text; or
   a portion of memory employed by the software module during execution.

7. The system of claim 5, wherein the determining of the at least one host device on which the software module is executable further comprises accessing metadata describing the at least one host device associated with the document, the metadata provided by one or more of:
- a document repository that includes the document;
- a deployment service for deploying the software module to the at least one host device; or
- a build service for generating the software module based on the document.

8. The system of claim 5, wherein the sensitive information includes one or more of a username, a password, a cryptographic key, an initialization vector for a cipher, an Ethernet address, a media access control (MAC) address, a universally unique identifier (UUID), or a uniform resource locator (URL).

9. The system of claim 5, wherein
- the identifying of the at least one data element is further based on determining a context for the at least one data element in the document; and
- the context includes the at least one data element being included in a parameter passed to the software module for referencing an identification of the host device.

10. The system of claim 5, wherein:
- the at least one data element includes at least one string; and
- the identifying of the at least one data element further comprises searching the document for the at least one string delimited by one or more string delimiter characters.

11. The system of claim 5, wherein the identifying the at least one data element with information entropy at least equal to a threshold information entropy further comprises:
- determining a baseline information entropy that indicates a randomness of information included in a set of documents that includes the document;
- analyzing the document to determine an information entropy of at least one portion of the document;
- determining that the information entropy of the at least one portion of the document is equal to at least the threshold information entropy, the threshold information entropy based at least in part on the baseline information entropy; and
- identifying the at least one portion of the document as the at least one data element.

12. The system of claim 11, wherein the threshold information entropy is further based on one or more of:
- a programming language for describing information in the document;
- a natural language for describing the information in the document;
- an estimated age of an author of the document;
- an estimated education level of the author of the document;
- a location of the author of the document;
- a group affiliation of the author of the document;
- a natural language used by the author of the document;
- an estimated age of a recipient of the document;
- an estimated education level of the recipient of the document;
- a format of the document; or
- a characteristic of a computing device for generating the document.

13. The system of claim 5, wherein:
- the identifying of the at least one data element is further based on determining a context for the at least one data element in the document; and
- the context includes a proximity of the at least one data element to an identification of the at least one host device in the document.

14. The system of claim 13, wherein the identification of the at least one host device includes one or more of:
- a Uniform Resource Identifier (URI);
- a network address;
- a media access control (MAC) address;
- a unique device identifier; or
- a hostname.

15. One or more non-transitory computer-readable media storing instructions which, when executed by at least one processor, instructing the at least one processor for performing actions comprising:
- accessing a data structure that includes at least one data element having information entropy equal to at least a threshold information entropy detected in at least one document associated with a software module;
- during execution of the software module, providing the at least one data element for requesting access to one or more secure features of the software module;
- determining that the providing of the at least one data element enables the access to the one or more secure features; and
- designating the at least one data element as sensitive information written into the at least one document.

16. The one or more non-transitory computer-readable media of claim 15, wherein the at least one document includes one or more of:
- a source code file including source code for the software module;
- an object code file including object code for the software module;
- a configuration file for building the software module;
- a message including formatted or unformatted text; or
- a portion of memory employed by the software module during execution.

17. The one or more non-transitory computer-readable media of claim 15, wherein:
- the at least one data element comprises a set of test credentials including a username and a password; and
- the providing of the at least one data element for requesting the access to the one or more secure features includes sending the set of test credentials for logging in to the software module.

18. The one or more non-transitory computer-readable media of claim 15, the actions further comprising:
- updating the data structure for indicating a result of the providing of the at least one data element for requesting the access to the one or more secure features.

19. The one or more non-transitory computer-readable media of claim 15, the actions further comprising:
- modifying the at least one document, including one or more of:
  - deleting the at least one data element from the at least one document; or
  - altering the at least one data element in the at least one document.

20. The one or more non-transitory computer-readable media of claim 15, the actions further comprising:
- sending a notification describing the at least one data element as the sensitive information written into the at least one document.

* * * * *

UNITED STATES PATENT AND TRADEMARK OFFICE
CERTIFICATE OF CORRECTION

| | | |
|---|---|---|
| PATENT NO. | : 9,465,942 B1 | Page 1 of 1 |
| APPLICATION NO. | : 14/459037 | |
| DATED | : October 11, 2016 | |
| INVENTOR(S) | : David James Kane-Parry et al. | |

It is certified that error appears in the above-identified patent and that said Letters Patent is hereby corrected as shown below:

Title Page of Patent, (56) References Cited, U.S. Patent Documents:
Missing Patent Reference:
2008/0120722 A1* 05/2008 Sima ... G06F 21/00 726/25

Signed and Sealed this
Twentieth Day of December, 2016

Michelle K. Lee
*Director of the United States Patent and Trademark Office*